（12）United States Patent
Xu et al.

(10) Patent No.: US 11,361,570 B2
(45) Date of Patent: Jun. 14, 2022

(54) RECEIPT IDENTIFICATION METHOD, APPARATUS, DEVICE AND STORAGE MEDIUM

(71) Applicant: Hangzhou Glority Software Limited, Hangzhou (CN)

(72) Inventors: Qingsong Xu, Hangzhou (CN); Qing Li, Hangzhou (CN)

(73) Assignee: Hangzhou Glorify Software Limited, Hangzhou (CN)

( * ) Notice: Subject to any disclaimer, the term of this patent is extended or adjusted under 35 U.S.C. 154(b) by 0 days.

(21) Appl. No.: 17/216,669

(22) Filed: Mar. 29, 2021

(65) Prior Publication Data

US 2021/0216765 A1 Jul. 15, 2021

Related U.S. Application Data

(63) Continuation-in-part of application No. PCT/CN2019/103848, filed on Aug. 30, 2019.

(30) Foreign Application Priority Data

May 9, 2019 (CN) .......................... 201910386149.0
Apr. 9, 2020 (CN) .......................... 202010274197.3

(51) Int. Cl.
*G06V 30/414* (2022.01)
*G06V 30/148* (2022.01)
(Continued)

(52) U.S. Cl.
CPC .......... *G06V 30/414* (2022.01); *G06F 16/953* (2019.01); *G06V 20/62* (2022.01);
(Continued)

(58) Field of Classification Search
CPC .... G06V 30/10; G06V 30/153; G06V 30/413; G06V 30/414; G06V 30/416; G06V 30/418; G06V 20/62; G06F 16/953
See application file for complete search history.

(56) References Cited

U.S. PATENT DOCUMENTS

2014/0268250 A1\* 9/2014 Nepomniachtchi .... G06V 10/22
358/462

FOREIGN PATENT DOCUMENTS

CN 102737239 10/2012
CN 104573735 4/2015
(Continued)

OTHER PUBLICATIONS

Xu, et al. (Computer English Translation of Chinese Patent No. CN109241857 A), pp. 1-17. (Year: 2019).\*
(Continued)

*Primary Examiner* — Daniel G Mariam
(74) *Attorney, Agent, or Firm* — JCIP Global Inc.

(57) ABSTRACT

A receipt identification method, an apparatus, a device, and a storage medium are provided. The method includes: obtaining a receipt image; identifying the receipt image by using a region identification model to obtain character regions; utilizing a character identification model to identify the character regions to obtain character contents; and determining receipt information according to the character contents. The step of determining receipt information according to the character contents includes: determining N keyword character regions corresponding to N preset keywords; determining M candidate character regions corresponding to the N keyword character regions; utilizing a scoring model to score based on the distance and the deviation angle between the N keyword character regions and the M candidate character regions in the receipt image, so as to determine Q character contents corresponding to the
(Continued)

N preset keywords; and determining target information in the receipt information according to the Q character contents.

22 Claims, 8 Drawing Sheets

(51) Int. Cl.
    *G06V 30/413* (2022.01)
    *G06V 30/418* (2022.01)
    *G06F 16/953* (2019.01)
    *G06V 30/416* (2022.01)
    *G06V 20/62* (2022.01)
    *G06V 30/10* (2022.01)

(52) U.S. Cl.
    CPC .......... *G06V 30/153* (2022.01); *G06V 30/413* (2022.01); *G06V 30/416* (2022.01); *G06V 30/418* (2022.01); *G06V 30/10* (2022.01)

(56) References Cited

FOREIGN PATENT DOCUMENTS

| | | |
|---|---|---|
| CN | 107808154 | 3/2018 |
| CN | 108564035 | 9/2018 |
| CN | 109241857 | 1/2019 |
| CN | 109711402 | 5/2019 |
| JP | 2012226402 | 11/2012 |

OTHER PUBLICATIONS

Tian, et al. (Computer English Translation of Chinese Patent No. CN108446621 A), pp. 1-15. (Year: 2018).*

* cited by examiner

Hudson News

LOGAN INT'L AIRPORT — M1
300 TERMINAL C
EAST BOSTON, MA 02128

STORE: 010    REG: 001 CASHIER: Wu
COCA-COLA CLASSIC 20oz
4900000443    1 @ 2.49         2.54 N
    Container Deposit .05   .05
SUBTOTAL                        2.54
TOTAL                           2.54
AMOUNT TENDERED
Cash                           10.00

TOTAL PAYMENT                  10.00
CHANGE                          7.46
Transaction: 39      8/8/2017 6:52 AM — T1

We accept returns (except for
magazines and newspapers) for exchange
or refund within 14 days of original
purchase date when accompanied by the
sales receipt and in original
packaging and original condition Comments\Inquiries? (800)326-77
or Email commen @hudson
Thank You for shopping with us.

FIG. 2A

Low Prices...Love The Savings!

630 CHAMPION DRIVE CANTON,NC
STORE #55 828-648-3200
STORE MANAGER: PAT BOWMAN
YOUR CASHIER TODAY WAS SARAH H
Deli
    REG CHAI GRN T    4.15 T
    TAX    0.29
**** BALANCE    4.44
*****************************
STARBUCKS GC CARD - SCANNED
ACCOUNT NUMBER  :************7301 1805
TOTAL AMOUNT  :4.44
G/C END. BALANCE:32.84
RESPONSE CODE  :APPROVED
    STARBUCKS GC    4.44
    CHANGE    0.00
TOTAL NUMBER OF ITEMS SOLD =  1
08/03/17 08:33pm 55 19 259 503

JOIN INGLES ADVANTAGE
AND BEGIN SAVING TODAY

THANK YOU FOR SHOPPING INGLES #55
CORPORATE CUSTOMER SRV 1-866-226-7168
OR WWW.INGLES-MARKETS.COM

FIG. 2B

RECEIPT IDENTIFICATION METHOD, APPARATUS, DEVICE AND STORAGE MEDIUM

CROSS-REFERENCE TO RELATED APPLICATION

This application is a continuation-in-part application of International Application No. PCT/CN2019/103848, filed on Aug. 30, 2019, which claims the priority benefits of China Application No. 201910386149.0, filed on May 9, 2019. This application is also claims the priority benefit of China application serial no. 202010274197.3, filed on Apr. 9, 2020. The entirety of each of the above-mentioned patent applications is hereby incorporated by reference herein and made a part of this specification.

BACKGROUND

Field of the Disclosure

The embodiments of the disclosure relate to a receipt identification method, a receipt identification apparatus, a smart receipt identification device, and a non-transitory computer-readable storage medium.

Description of Related Art

With the continuous development of the economy, people's consumption levels continue to improve. In order to protect consumers' rights, receipts have become a proof and effective reimbursement documents for consumers. Therefore, financial personnel need to process a large number of receipts every day to obtain information on receipts, such as ticketing time, ticketing store, payment amount, etc. In addition, there is an increasing number of people who utilize accounting classification statistics to keep a record of their own spending habits. Currently, people usually keep accounts by manually recording relevant information on receipts. Therefore, how to automatically identify the relevant information on the receipt is very important for financial personnel and individuals who keep accounting classification statistics.

SUMMARY OF THE DISCLOSURE

At least an embodiment of the disclosure provides a receipt identification method, including: obtaining a receipt image, wherein the receipt image includes a receipt to be identified; identifying the receipt image by using a region identification model to obtain a plurality of character regions; identifying the plurality of character regions by using a character identification model to obtain a plurality of character contents corresponding to the plurality of character regions; determining receipt information corresponding to the receipt to be identified according to the plurality of character contents, wherein the receipt information includes target information. The step of determining receipt information corresponding to the receipt to be identified according to the plurality of character contents includes: determining N keyword character regions corresponding to N preset keywords in the plurality of character regions according to the plurality of character contents; determining M candidate character regions corresponding to the N keyword character regions in the plurality of character regions; utilizing a scoring model to score based on a distance and a deviation angle between the N keyword character regions and the M candidate character regions in the receipt image, so as to determine Q character contents corresponding to the N preset keywords; and determining target information according to the Q character contents, wherein N, M and Q are positive integers.

For example, in the receipt identification method provided in an embodiment of the disclosure, N and/or M are greater than or equal to 2, and the step of utilizing a scoring model to score based on the distance and the deviation angle between the N keyword character regions and the M candidate character regions in the receipt image, so as to determine Q character contents corresponding to the N preset keywords includes: determining a plurality of score calculating groups according to the N keyword character regions and the M candidate character regions, wherein each of the score calculating groups represents a corresponding relationship between the N keyword character regions and the M candidate character regions; calculating a plurality of scores corresponding to the plurality of score calculating groups based on the distance and deviation angle between the N keyword character regions and the M candidate character regions, and determining the score calculating group corresponding to the highest score among the plurality of scores as the target score calculating group; determining the Q character contents corresponding to the N preset keywords according to the corresponding relationship between the N keyword character regions and the M candidate character regions represented by the target score calculating group.

For example, in the receipt identification method provided in an embodiment of the disclosure, the step of calculating the plurality of scores corresponding to the plurality of score calculating groups includes: for each score calculating group in the plurality of score calculating groups, calculating N scores corresponding to the N keyword character regions according to the distance and the deviation angle between the N keyword character regions and the candidate character regions corresponding to the N keyword character regions in the score calculating group, wherein in the score calculating group, the greater the distance between the connection line between the center of each keyword character region and the center of its corresponding candidate character region, the smaller the score corresponding to each keyword character region. The deviation angle between each keyword character region and its corresponding candidate character region represents the angle between the connection line between the center of each keyword character region and the center of its corresponding candidate character region and the preset direction. The smaller the deviation angle between each keyword character region and its corresponding candidate character region, the greater the score corresponding to each keyword character region. The N scores are summed to obtain the score corresponding to the score calculating group, thereby obtaining the plurality of scores corresponding to the plurality of score calculating groups.

For example, in the receipt identification method provided in an embodiment of the disclosure, the step of determining the M candidate character regions corresponding to N keyword character regions in a plurality of character regions includes: determining the score summing region by using the region identification model based on the N preset keywords; determining the M candidate character regions in the plurality of character regions based on the score summing region, wherein the M candidate character regions are located in the score summing region.

For example, in the receipt identification method provided by an embodiment of the disclosure, the target information is the item quantity and is represented by digits, and the character content in each of the M candidate character regions is digits.

For example, in the receipt identification method provided by an embodiment of the disclosure, the N preset keywords include an amount keyword, and the step of determining target information based on the Q character contents includes: converting the N preset keywords into a phrase to be queried, selecting the target amount determining rule corresponding to the phrase to be queried in the rule database, wherein the rule database stores a plurality of different phrases to be queried and the amount determining rules corresponding to the plurality of phrases to be queried; determining the amount keyword among the N preset keywords according to the target amount determining rule; determining the character content corresponding to the amount keyword in the Q character contents according to the amount keyword; determining the item quantity according to the character content corresponding to the amount keyword.

For example, in the receipt identification method provided by an embodiment of the disclosure, the receipt information further includes the item name, and the step of determining the receipt information corresponding to the receipt to be identified based on the plurality of character contents further includes: utilizing a text classification identification model to classify the plurality of character contents so as to determine at least one candidate item name; determining the item name corresponding to the receipt to be identified according to at least one candidate item name.

For example, in the receipt identification method provided in an embodiment of the disclosure, the step of determining the item name corresponding to the receipt to be identified according to the at least one candidate item name includes: sorting the at least one candidate item name to determine at least one candidate item name group, wherein all candidate item names in each candidate item name group in the at least one candidate item name group are the same; determining the target candidate item name group according to the at least one candidate item name group, wherein the number of candidate item names in the target candidate item name group is more than the number of the candidate item names in any of the remaining candidate item name groups in the at least one candidate item name group; using the candidate item name corresponding to the target candidate item name group as the item name.

For example, in the receipt identification method provided by an embodiment of the disclosure, the receipt information further includes an item address, and the step of determining the receipt information corresponding to the receipt to be identified based on the plurality of character contents further includes: utilizing a text classification identification model to classify the plurality of character contents so as to determine at least one candidate item address; and determining the item address corresponding to the receipt to be identified according to the at least one candidate item address.

For example, in the receipt identification method provided in an embodiment of the disclosure, the step of determining the item address corresponding to the receipt to be identified according to the at least one candidate item address includes: sorting the at least one candidate item address to determine at least one candidate item address group, wherein all candidate item addresses in each candidate item address group in the at least one candidate item address group are the same; determining the target candidate item address group according to the at least one candidate item address group, wherein the number of the candidate item addresses in the target candidate item address group is more than the number of the candidate item addresses in any of the remaining candidate item address groups in the at least one candidate item address group; using the candidate item address corresponding to the target candidate item address group as the item address.

For example, in the receipt identification method provided by an embodiment of the disclosure, the receipt information further includes the item name, and the step of determining the receipt information corresponding to the receipt to be identified based on the plurality of character contents further includes: utilizing a text classification identification model to classify the plurality of character contents so as to determine at least one first candidate item name; determining at least one second candidate item name by searching in the item name database according to the plurality of character contents; determining the item name corresponding to the receipt to be identified according to the at least one first candidate item name and the at least one second candidate item name.

For example, in the receipt identification method provided by an embodiment of the disclosure, when the receipt to be identified contains a pattern, the step of determining the at least one second candidate item name by searching in the item name database according to the plurality of character contents includes: utilizing the region identification model to identify the pattern region where the pattern in the receipt image is located; determining whether there is an item pattern matching the pattern in the item name database according to the pattern region; if there is an item pattern matching the pattern in the item name database, determining the item name corresponding to the item pattern that matches the pattern as at least one second candidate item name; if there is no item pattern matching the pattern in the item name database, determining whether there are characters in the pattern region. If there are characters in the pattern region, the pattern character in the pattern region is identified, and the identified pattern character is used as at least one second candidate item name; if there are no characters in the pattern region, the item address is determined based on the plurality of character contents, and the item address is determined as the at least one second candidate item name; wherein each item pattern in the item name database is marked with the corresponding item name.

For example, in the receipt identification method provided by an embodiment of the disclosure, the receipt information further includes an item address, and the step of determining the receipt information corresponding to the receipt to be identified based on the plurality of character contents further includes: utilizing a text classification identification model to classify the plurality of character contents to determine at least one first candidate item address. If a preset character for identifying the address appears in one character region of the plurality of character regions, the character following the preset character is used as at least one second candidate item address; and/or, if a character corresponding to the administrative region name or street name appears in a character region of the plurality of character regions, the character corresponding to the administrative region name or street name is used as at least one second candidate item address. The item address corresponding to the receipt to be identified is determined according to the at least one first candidate item address and the at least one second candidate item address.

An embodiment of the disclosure provides a receipt identification apparatus, which includes: an acquisition module configured to obtain a receipt image, wherein the receipt image includes a receipt to be identified; a first identification module configured to identify a receipt image by using a region identification model to obtain a plurality of character regions; a second identification module configured to identify the plurality of character regions by using a character identification model to obtain a plurality of character contents corresponding to the plurality of character regions; a determining module configured to determine the receipt information corresponding to the receipt to be identified according to the plurality of character contents, wherein the receipt information includes target information. When performing the operation of determining the receipt information corresponding to the receipt to be identified according to the plurality of character contents, the determining module is configured to perform following operations: determining N keyword character regions corresponding to N preset keywords in the plurality of character regions according to the plurality of character contents; determining M candidate character regions corresponding to the N keyword character regions in the plurality of character regions; utilizing a scoring model to score based on the distance and the deviation angle between the N keyword character regions and the M candidate character regions in the receipt image, so as to determine Q character contents corresponding to the N preset keywords; and determining the target information according to the Q character contents, wherein N, M and Q are positive integers.

For example, in a receipt identification apparatus provided in the an embodiment of the disclosure, N and/or M are greater than or equal to 2, and when performing the operation of utilizing a scoring model to score based on the distance and the deviation angle between the N keyword character regions and the M candidate character regions, so as to determine Q character contents corresponding to the N preset keywords, the determining module is configured to perform following operations: determining a plurality of score calculating groups according to the N keyword character regions and the M candidate character regions, wherein each of the score calculating groups represents a corresponding relationship between the N keyword character regions and the M candidate character regions; calculating a plurality of scores corresponding to the plurality of score calculating groups based on the distance and the deviation angle between the N keyword character regions and the M candidate character regions, and determining the score calculating group corresponding to the highest score among the plurality of scores as the target score calculating group; determining the Q character contents corresponding to the N preset keywords according to the corresponding relationship between the N keyword character regions and the M candidate character regions represented by the target score calculating group.

For example, in a receipt identification apparatus provided in the an embodiment of the disclosure, when performing the operation of calculating the plurality of scores corresponding to the plurality of score calculating groups, the determining module is configured to perform following operations: for each score calculating group in the plurality of score calculating groups, calculating N scores corresponding to the N keyword character regions according to the distance and the deviation angle between the N keyword character regions and the candidate character regions corresponding to the N keyword character regions in the score calculating group, wherein in the score calculating group, the greater the distance between the connection line between the center of each keyword character region and the center of its corresponding candidate character region, the smaller the score corresponding to each keyword character region. The deviation angle between each keyword character region and its corresponding candidate character region represents the angle between the connection line between the center of each keyword character region and the center of its corresponding candidate character region and the preset direction. The smaller the deviation angle between each keyword character region and its corresponding candidate character region, the greater the score corresponding to each keyword character region. The N scores are summed to obtain the score corresponding to the score calculating group, thereby obtaining the plurality of scores corresponding to the plurality of score calculating groups.

For example, in the receipt identification apparatus provided in an embodiment of the disclosure, when performing the operation of determining the M candidate character regions corresponding to the N keyword character regions in the plurality of character regions, the determining module is configured to perform following operations: determining the score summing region by using the region identification model based on the N preset keywords; determining the M candidate character regions in the plurality of character regions based on the score summing region, wherein the M candidate character regions are located in the score summing region.

For example, in the receipt identification apparatus provided in an embodiment of the disclosure, the receipt information further includes the item name, and when the performing the operation of determining the receipt information corresponding to the receipt to be identified based on the plurality of character contents, the determining module is further configured to perform following operations: utilizing a text classification identification model to classify the plurality of character contents so as to determine at least one candidate item name; determining the item name corresponding to the receipt to be identified according to the at least one candidate item name.

For example, in the receipt identification apparatus provided in an embodiment of the disclosure, the receipt information further includes an item address, and when performing the operation of determining the receipt information corresponding to the receipt to be identified based on the plurality of character contents, the determining module is further configured to perform following operations: utilizing the text classification identification model to classify the plurality of character contents so as to determine at least one candidate item address; and determining the item address corresponding to the receipt to be identified according to the at least one candidate item address.

For example, in the receipt identification apparatus provided in an embodiment of the disclosure, the receipt information further includes the item name and the item address, and when performing the operation of determining the receipt information corresponding to the receipt to be identified based on the plurality of character contents, the determining module is further configured to perform following operations: utilizing a text classification identification model to classify the plurality of character contents to determine at least one first candidate item name and at least one first candidate item address; determining at least one second candidate item name by searching in the item name database according to the plurality of character contents. If a preset character for identifying the address appears in one character region of the plurality of character regions, the character following the preset character is used as at least one second candidate item address; and/or, if a character corresponding to the administrative region name or street name appears in a character region of the plurality of character regions, the character corresponding to the administrative region name or street name is used as at least one second candidate item address. The item address corresponding to the receipt to be identified is determined according to the at least one first candidate item name and the at least one second candidate item name; and the item address corresponding to the receipt to be identified is determined according to the at least one first candidate item address and the at least one second candidate item address.

An embodiment of the disclosure further provides a smart receipt identification device, including: an image acquisition component configured to obtain a receipt image, wherein the receipt image includes the receipt to be identified; a memory configured to non-transitorily store the receipt image and computer-readable instructions; a processor configured to read the receipt image and run the computer-readable instructions, wherein the computer-readable instructions are executed by the processor to implement the receipt identification method according to any of the above embodiments.

An embodiment of the disclosure further provides a non-transitory computer-readable storage medium, wherein the non-transitory computer-readable storage medium stores computer-readable instructions, and the computer-readable instructions are executed by the processor to implement the receipt identification method according to any of the above embodiments.

BRIEF DESCRIPTION OF THE DRAWINGS

In order to explain the technical solutions of the embodiments of the present disclosure more clearly, the drawings of the embodiments will be briefly introduced below. Clearly, the drawings in the following description only relate to some embodiments of the present disclosure, rather than limit the present disclosure.

FIG. 2A is a schematic diagram of a receipt image provided by at least one embodiment of the disclosure.

FIG. 2B is a schematic diagram of another receipt image provided by at least one embodiment of the disclosure.

DESCRIPTION OF EMBODIMENTS

Figure 1A:
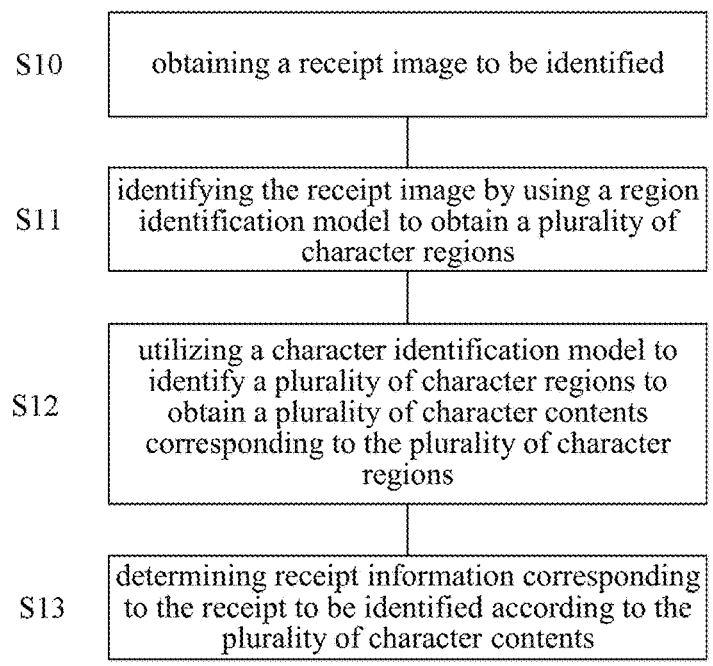
FIG. 1A is a schematic flowchart of a receipt identification method according to at least one embodiment of the disclosure.

In order to make the objectives, technical solutions and advantages of the disclosure clearer, the following further clearly and thoroughly describes the technical solution in the embodiments of the disclosure with reference to the accompanying drawings in the embodiments of the disclosure. Clearly, the specific embodiments described here are only a part of the embodiments of the disclosure rather than all the embodiments. Based on the described embodiments of the disclosure, all other embodiments obtained by those of ordinary skill in the art without making inventive labor fall within the scope sought to be protected by the disclosure.

Unless otherwise defined, the technical terms or scientific terms used in the present disclosure shall have the usual meanings understood by those with ordinary skills in the field to which this disclosure belongs. The "first", "second" and the like used in the present disclosure do not indicate any order, quantity, or importance, but are only used to distinguish different components. The terms "include" or "comprise" and other similar words mean that the element or item appearing before the word encompasses the element or item listed after the word and its equivalents, but does not exclude other elements or objects. The terms "connected" or "linked" and the like are not limited to physical or mechanical connections, but may include electrical connections either directly or indirectly. The terms "Up", "Down", "Left", "Right", etc. are only used to indicate the relative position relationship. When the absolute position of the described object changes, the relative position relationship may also change accordingly.

At least an embodiment of the disclosure provides a receipt identification method, a receipt identification apparatus, a smart receipt identification device, and a non-transitory computer-readable storage medium. The receipt identification method includes: obtaining a receipt image, wherein the receipt image includes a receipt to be identified; identifying the receipt image by using a region identification model to obtain a plurality of character regions; identifying a plurality of character regions by using a character identification model to obtain a plurality of character contents corresponding to the plurality of character regions; determining receipt information corresponding to the receipt to be identified according to the plurality of character contents, wherein the receipt information includes target information. The step of determining receipt information corresponding to the receipt to be identified according to the plurality of character contents includes: determining N keyword character regions corresponding to N preset keywords in the plurality of character regions according to the plurality of character contents; determining M candidate character regions corresponding to the N keyword character regions in the plurality of character regions; utilizing a scoring model to score based on the distance and the deviation angle between the N keyword character regions and the M candidate character regions in the receipt image, so as to determine Q character contents corresponding to the N preset keywords; and determining target information according to the Q character contents, wherein N, M and Q are positive integers.

The receipt identification method provided by the disclosure scores based on the distance and deviation angle between the keyword character region of the keyword and the candidate character region, so as to determine the character content corresponding to the keyword in the plurality of character contents in the plurality of character regions, and finally the receipt information in the receipt to be identified is determined through the character content corresponding to the keyword, thereby achieving efficient and accurate automatic identification and display of receipt information on the receipt, and improving the efficiency of receipt processing. The character content corresponding to the keyword is accurately determined, and the receipt information is determined based on the character content corresponding to the keyword, thus improving the accuracy and efficiency of obtaining the receipt information. For example, for receipt images with skewed character regions and improperly filled (by manual and/or machine) positions, etc., both the receipt identification method and receipt identification apparatus in the embodiments of the disclosure can be used to accurately identify the receipt information on the receipt.

The receipt identification method in the embodiment of the disclosure can be applied to the receipt identification apparatus in the embodiment of the disclosure, and the receipt identification apparatus can be configured on an electronic device. The electronic device may be a personal computer, a mobile terminal, etc., and the mobile terminal may be a hardware device such as a mobile phone or a tablet computer.

The embodiments of the present will be described in detail below with reference to the accompanying drawings, but the disclosure is not limited to these specific embodiments.

Figure 1B:
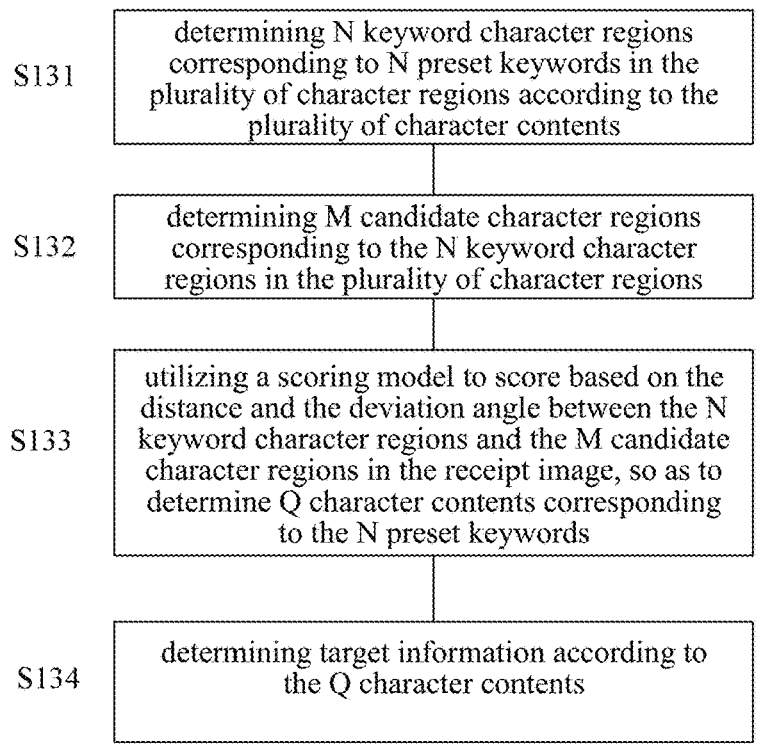
FIG. 1B is a schematic flowchart of step S13 in the receipt identification method shown in FIG. 1A.

FIG. 1A is a schematic flowchart of a receipt identification method according to at least one embodiment of the disclosure. FIG. 1B is a schematic flowchart of step S13 in the receipt identification method shown in FIG. 1A. FIG. 2A is a schematic diagram of a receipt image provided by at least one embodiment of the disclosure. FIG. 2B is a schematic diagram of another receipt image provided by at least one embodiment of the disclosure.

As shown in FIG. 1A, the method includes steps S10 to S15. First, in the receipt identification method provided in an embodiment of the disclosure, in step S10, a receipt image is obtained, wherein the receipt image includes a receipt to be identified.

For example, in step S10, the receipt image may be any image including a receipt, for example, as shown in FIG. 2A and FIG. 2B, in some embodiments, the receipt image 100 may be an image of a shopping list. The disclosure is not limited thereto. In other embodiments, the receipt image 100 may also be a catering receipt or the like. It should be noted that the receipt image 100 refers to a form in which the receipt is presented in a visual manner, such as a picture or video of the receipt.

The "receipt to be identified" referred to in this disclosure refers to the physical object on which information is recorded. The information is arranged on the receipt in some patterns and consists of one or more characters such as Chinese characters and foreign characters (for example, English, Japanese, Korean, German, etc.), digits, symbols, graphics and so on. Some specific examples of the "receipts to be identified" referred to in the disclosure may be invoices, bills, tax statements, receipts of payment, shopping lists, catering receipts, and other receipts filled manually and/or by machine. Those skilled in the art can understand that the "receipts to be identified" referred to in the disclosure are not limited to the specific examples listed in this disclosure, and are not limited to financial or commercial-related receipts, and may be receipts with printed fonts or a handwritten font, and may be receipts with a prescribed and/or general format or may not be a receipt with a prescribed and/or general format.

For example, the shape of the receipt to be identified in the receipt image 100 may be a regular shape such as a rectangle, or may be an irregular shape. As shown in FIG. 2A and FIG. 2B, the shopping list has a rectangular shape. It is worth noting that in the disclosure, "the shape of the receipt" means the general shape of the receipt. For example, when the shape of the receipt is a rectangle, each side of the rectangle may not be a straight line segment, but may be line segments with small waves, zigzags, and so on in the image.

For example, the shape of the receipt image 100 may also be a rectangle or the like. The shape and size of the receipt image 100 can be set by the user according to the actual situation.

For example, the receipt image 100 may be an image taken by a digital camera or a mobile phone, and the receipt image 100 may be a grayscale image or a color image. For example, the receipt image 100 may be an original image directly captured by an image capturing device, or may be an image obtained after preprocessing the original image. For example, in order to avoid the effect caused by the material quality and material imbalance on the receipt image 100 in receipt image identification, before the receipt image 100 is processed, the receipt image identification method provided by at least one embodiment of the disclosure may further include performing a preprocessing operation on the receipt image 100. The preprocessing can eliminate irrelevant information or noise information from the receipt image 100, so as to better process the receipt image 100.

Next, as shown in FIG. 1A, in step S11, the receipt image is identified by using the region identification model to obtain a plurality of character regions.

For example, the region identification model can be implemented by using machine learning technology and run on a general-purpose computing device or a specific-purpose computing device, for example. The region identification model is a neural network model obtained through pre-training. For example, the region identification model can be implemented by using neural networks such as Deep Convolutional Neural Network (DEEP-CNN). The receipt image is input into the region identification model, and the region identification model can identify the region where each character in the receipt to be identified is located, and mark each character region that is identified.

Next, as shown in FIG. 1A, in step S12, a character identification model is utilized to identify a plurality of character regions to obtain a plurality of character contents corresponding to the plurality of character regions.

For example, the character identification model can be implemented based on optical character recognition technology and the like and run on a general-purpose computing device or a specific-purpose computing device, for example. For instance, the character identification model can also be a pre-trained neural network model. In some embodiments, for example, the plurality of character contents obtained through identification may have semantic errors, logical errors, etc. Therefore, it is necessary to verify the character contents obtained by the character identification model, so as to correct the semantic errors, logical errors, and so on, thereby obtaining accurate character content.

For example, there is a one-to-one correspondence between the plurality of character regions and the plurality of character contents.

For example, the character content corresponding to each character region includes at least one character, and each character can be a single Chinese character, a single foreign character (for example, a single English letter or a single English word, etc.), a single digit, a single symbol, single graphic, single punctuation, etc.

For example, the character content recorded in each receipt can include related text information of the receipt. For example, when the receipt is an invoice, the related text information of the receipt can be the name and address of the invoicing company. When the receipt is a shopping list, the related text information of the receipt can be the name and address of the store where the product was purchased and other text information. It should be noted that the character content recorded in the receipt may also include information such as amount of payment, amount of change, tax, etc.

For example, as shown in FIG. 2A, the receipt image of the shopping list shown in FIG. 2A shows a plurality of character regions (regions shown by multiple rectangular frames) on the receipt image, and the plurality of character regions include the character region corresponding to "SUBTOTAL", the character region corresponding to "TOTAL", the character region corresponding to "Cash", the character region corresponding to "TOTAL PAYMENT", the character region corresponding to "CHANGE", the character region corresponding to "@hudson", the character region corresponding to "LOGAN INT'L AIRPORT", the character region corresponding to "300 TERMINAL C", and the character region corresponding to "EAST BOSTON, Mass. 02128" and so on. For example, as shown in FIG. 2B, the receipt image of the shopping list shown in FIG. 2B shows a plurality of character regions (regions shown by multiple rectangular frames) on the receipt image, and the plurality of character region include the character region corresponding to "TAX", the character region corresponding to "TOTAL AMOUNT", the character region corresponding to "BALANCE", the character region corresponding to "STORE #55", the character region corresponding to "CHANGE", and the character region corresponding to "630 CHAMPION DRIVE CANTON, N.C.", etc.

It should be noted that the plurality of character regions (regions shown by multiple rectangular boxes) shown in FIG. 2A are only part of the character regions in the receipt image of the shopping list, not all of the character regions on the receipt image of the shopping list. For example, the receipt image of the shopping list shown in FIG. 2A may also include a character region corresponding to "STORE: 010". Similarly, the plurality of character regions (regions shown by multiple rectangular boxes) shown in FIG. 2B are only part of the character regions in the receipt image of the shopping list, not all of the character regions on the receipt image of the shopping list. For example, the receipt image of the shopping list shown in FIG. 2B may also include a character region corresponding to "Dell" and the like.

For example, the shapes of the plurality of character regions may all be regular shapes such as rectangles, circles, rhombuses, etc., but are not limited to this, and the shapes of the plurality of character regions may also be irregular shapes. The specific size of each character region is determined according to the character content corresponding to the character region. For example, the shapes of the plurality of character regions shown in FIG. 2A are all rectangles. However, the size of the character region corresponding to "SUBTOTAL" and the size of the character region corresponding to "TOTAL" are different.

For example, when the character content corresponding to each character region includes a plurality of characters, in the character region, the plurality of characters may be arranged substantially along a straight line. For example, in some embodiments, the plurality of characters may be substantially arranged in a row in the horizontal direction or in a column in the vertical direction, and the horizontal direction and the vertical direction are perpendicular to each other. For example, as shown in FIG. 2B, the plurality of characters in the character region corresponding to "630 CHAMPION DRIVE CANTON, N.C." (for example, the character "630", the character "CHAMPION", the character "DRIVE", the character "CANTON" and the character "N.C.") are arranged substantially in a row in the horizontal direction. In another example, when the character content corresponding to the character region includes a plurality of characters, in the character region, the plurality of characters may also be arranged in multiple rows and multiple columns, for example, two rows and one column, one row and two columns, etc.

For example, the plurality of character regions may not overlap each other, or at least part of the character regions may partially overlap. For example, the plurality of character regions shown in FIG. 2A do not overlap each other, while in the example shown in FIG. 2B, the character region corresponding to "STORE #55" and the character region corresponding to "630 CHAMPION DRIVE CANTON, N.C." partially overlap each other. Those skilled in the art can understand that the receipt image 100 shown in FIG. 2A and FIG. 2B is only schematic and cannot be construed as a limitation to the disclosure. The receipt and character regions in the receipt image can be determined based on actual conditions.

For example, in some embodiments, after the plurality of character regions are identified, the character identification model can be directly adopted to perform character identification on the receipt image marked with the character region. For example, in step S12, a character identification model can be used to simultaneously identify characters in the plurality of character regions, so as to obtain the plurality of character contents respectively corresponding to the plurality of character regions. In another example, the character identification model can be adopted to separately identify the characters in each character region in the plurality of character regions, so as to obtain the character content corresponding to each character region, thereby obtaining the plurality of character contents respectively corresponding to the plurality of character regions. In other words, the character identification model can perform character identification on all character regions at the same time, and can also perform character identification on all character regions separately in sequence.

For example, in other embodiments, after the plurality of character regions are identified and obtained, the plurality of character regions can be cut and a character image of each character region of the plurality of character regions may be obtained. For example, after identifying the plurality of character regions, the receipt identification method further includes: for each character region in the plurality of character regions, each character region is cut to obtain a character image corresponding to each character region, thereby obtaining a plurality of character images respectively corresponding to the plurality of character regions. For instance, after cutting each character region to obtain a character image, step S12 may include: identifying a plurality of character images through a character identification model to obtain a plurality of character contents respectively corresponding to the plurality of character regions. For example, the character identification model can be adopted to simultaneously identify a plurality of character images corresponding to a plurality of character regions, so as to obtain a plurality of character contents respectively corresponding to the plurality of character regions; or a character identification model is adopted to sequentially identify the character image corresponding to each character region, so as to obtain the character contents corresponding to the each character region, thereby obtaining the plurality of character contents respectively corresponding to the plurality of character regions. That is to say, the character identification model can perform character identification on all character images simultaneously, or perform character identification on all character images separately in sequence.

For example, the characters in the receipt to be identified can be the characters in a printed font or a handwritten font. In order to improve the accuracy of character identification, different character identification models are adopted for different fonts. The character identification model can include an identification model for printed fonts and an identification model for handwritten fonts. The identification model for printed fonts and the identification model for handwritten fonts are trained separately. For handwritten fonts and printed fonts, different character training sets can be adopted to train the corresponding character identification models.

Next, as shown in FIG. 1A, in step S13, the receipt information corresponding to the receipt to be identified is determined according to the plurality of character contents.

For example, the receipt information includes target information. As shown in FIG. 1B, step S13 includes following steps.

Step S131: The N keyword character regions corresponding to the N preset keywords in the plurality of character regions are determined according to the plurality of character contents.

Step S132: The M candidate character regions corresponding to the N keyword character regions are determined in the plurality of character regions.

Step S133: A scoring model is used to score based on the distance and the deviation angle between the N keyword character regions and the M candidate character regions in the receipt image, so as to determine Q character contents corresponding to the N preset keywords.

Step S134: The target information is determined according to the Q character contents.

For example, N, M, and Q are all positive integers. The specific values of N, M, and Q are determined according to actual conditions, which are not limited in the embodiments of the disclosure.

For example, in some embodiments, the target information is an item quantity and is represented by digits, and the character content in each of the M candidate character regions is digits.

For example, in some embodiments, the target information may include information such as payment amount, amount of change, etc. The preset keywords are used to indicate the item names of each payment item in the payment region. For example, the preset keywords may include: subtotal, total, cash, change, discount, etc. For example, the keywords in international receipts can include: subtotal, total, ttl, tax, gratuity, cash, change, discount, service, payment, visa, etc. The keyword region containing the preset keyword can be determined according to the character content in each character region.

It should be noted that the number and specific types of preset keywords can be preset by the user.

For example, in some embodiments, step S132 includes: the region identification model determines the score summing region based on the N preset keywords; the M candidate character regions are determined in the plurality of character regions based on the score summing region, wherein the M candidate character regions are located in the score summing region.

For example, the score summing region is determined by the region identification model. In the process of training the region identification model, learning can be performed on the manually marked score summing region to establish the trained region identification model, such that the trained region identification model may directly find and divide the score summing region according to the N preset keywords.

For example, in other embodiments, step S132 includes: determining a score summing region based on the N keyword character regions; and determining the M candidate character regions in the plurality of character regions based on the score summing region.

For example, the M candidate character regions are located in the score summing region. When identifying the character region, the region identification model will simultaneously detect whether there is a character region corresponding to the digital character in a certain region (i.e., the score summing region) on the right and lower side of the N keyword character region. If there is a character region corresponding to the digital character, the character region corresponding to the digital character can be determined as the candidate character region.

For example, M can be greater than N, or less than N, and can also be equal to N. M and N are determined according to actual conditions, and the disclosure provides no limitation thereto.

For example, the step of determining the score summing region according to the N keyword character regions includes: determining the arrangement direction of the N keyword character regions; determining the first keyword character region and the last keyword character region at both ends in the arrangement direction in the N keyword character regions. In the arrangement direction, the first boundary of the score summing region is determined by extending a first distance in a direction far away from the last keyword character region along the first keyword character region; the second boundary of the score summing region is determined by extending a second distance in a direction far away from the first keyword character region along the last keyword character region. The third boundary and the fourth boundary of the score summing region are determined according to the two boundaries of the receipt image in a direction perpendicular to the arrangement direction, thereby determining the score summing region.

Figure 3A:
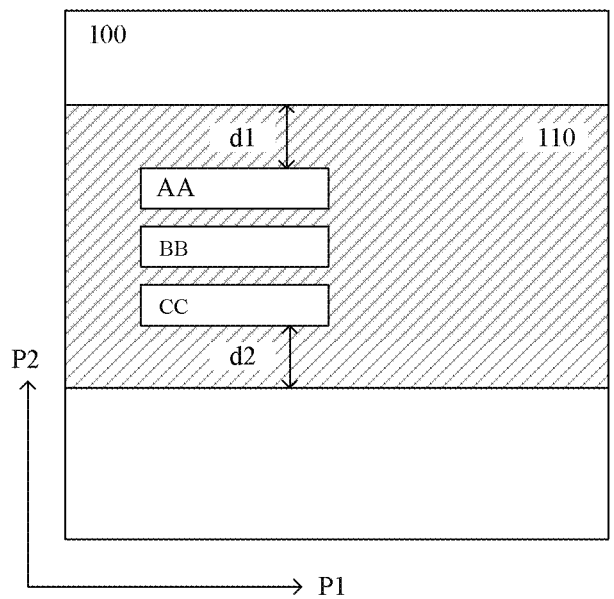
FIG. 3A is a schematic diagram of a receipt image provided by at least one embodiment of the disclosure.
Figure 3B:
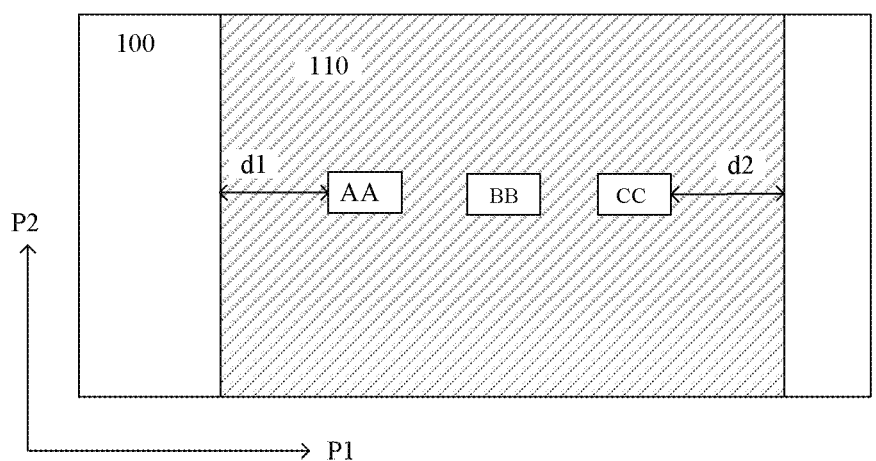
FIG. 3B is a schematic diagram of another receipt image provided by at least one embodiment of the disclosure.

FIG. 3A is a schematic diagram of a receipt image provided by at least one embodiment of the disclosure. FIG. 3B is a schematic diagram of another receipt image provided by at least one embodiment of the disclosure.

For example, as shown in FIG. 3A and FIG. 3B, in some embodiments, the receipt image includes a first keyword character region AA, a second keyword character region BB, and a third keyword character region CC. As shown in FIG. 3A, the arrangement direction of the first keyword character region AA, the second keyword character region BB, and the third keyword character region CC is the direction P2. In the direction P2, the first keyword character region AA and the third keyword character region CC are the first keyword character region and the last keyword character region located at both ends of the arrangement direction. That is, the first keyword character region AA is the first keyword character region, the third keyword character region CC is the last keyword character region, the second keyword character region BB is located between the first keyword character region AA and the third keyword character region CC, the first keyword character region AA is located on the upper side of the second keyword character region BB, and the third keyword character region CC is located on the lower side of the second keyword character region BB.

As shown in FIG. 3B, the arrangement direction of the first keyword character region AA, the second keyword character region BB, and the third keyword character region CC is the direction P1. In the direction P1, the first keyword character region AA and the third keyword character region CC are the first keyword character region and the last keyword character region located at both ends of the arrangement direction. That is, the first keyword character region AA is the first keyword character region, the third keyword character region CC is the last keyword character region, the second keyword character region BB is located between the first keyword character region AA and the third keyword character region CC, the first keyword character region AA is located on the left side of the second keyword character region BB, and the third keyword character region CC is located on the right side of the second keyword character region BB.

For example, as shown in FIG. 3A and FIG. 3B, the region indicated by diagonal lines is the score summing region 110. The shape of the score summing region 110 may also be a regular shape such as a rectangle, but the disclosure is not limited thereto. The shape of the score summing region 110 may also be an irregular shape, for example, an irregular quadrilateral. As shown in FIG. 3A, in the direction P2, the first boundary of the score summing region 110 can be determined by extending the first distance d1 in a direction far away from the last keyword character region (i.e., the third keyword character region CC) along the first keyword character region (i.e., the first keyword character region AA). The second boundary of the score summing region 110 can be determined by extending the second distance d2 in a direction far away from the first keyword character region (i.e., the first keyword character region AA) along the last keyword character region (i.e., the third keyword character region CC). Then, the third boundary and the fourth boundary of the score summing region 110 are determined according to the two boundaries of the receipt image 100 in a direction perpendicular to the arrangement direction (i.e., the direction P1 shown in FIG. 3A), thereby determining the score summing region 110. That is, in the direction P1, the two boundaries of the score summing region 110 overlap with the two boundaries of the receipt image 100.

It is worth noting that disclosure provides no limitation to the method of determining the score summing region. In other embodiments, other methods may be used to determine the score summing region. The example shown in FIG. 3A is taken as an example for illustration. In the direction P2, the first boundary of the score summing region 110 can be determined by extending the first distance d1 in a direction far away from the last keyword character region (i.e., the third keyword character region CC) along the first keyword character region (i.e., the first keyword character region AA). The second boundary of the score summing region 110 can be determined by extending the second distance d2 in a direction far away from the first keyword character region (i.e., the first keyword character region AA) along the last keyword character region (i.e., the third keyword character region CC). Then, the first keyword character region and the last keyword character region at both ends in the direction perpendicular to the arrangement direction (that is, the direction P1 shown in FIG. 3A) in the N keyword character regions are determined. In the direction P1, the third boundary of the score summing region is determined by extending a third distance (extending along the left side of the first keyword character region AA shown in FIG. 3A) in a direction opposite to the direction P1 from the first keyword character region (i.e., first keyword character region AA) in the direction P1. The fourth boundary of the score summing region is determined by extending a fourth distance (extending along the right side of the third keyword character region CC shown in FIG. 3A) in the direction P1 from the last keyword character region in the direction P1, thereby determining the score summing region.

It should be noted that the fourth distance is greater than any one of the first distance, the second distance, and the third distance. "The first keyword character region in the direction P1" can mean the keyword character region with the smallest coordinate value at P1-axis of the center of the N keyword character regions; "the last keyword character region in the direction P1" can mean the keyword character region with the largest coordinate value at P1-axis of the center of the N keyword character regions. In the example shown in FIG. 3A, the coordinate value at P1-axis of the center of the first keyword character region AA, the coordinate value at P1-axis of the center of the second keyword character region BB and the coordinate value at P1-axis of the center of the third keyword character region CC are the same. Then, any two keyword character regions among the first keyword character region AA, the second keyword character region BB and the third keyword character region CC are selected to serve as the first keyword character region in the direction P1 and the last keyword character region in the direction P1 respectively.

For example, the first distance and the second distance can be set by the user according to the actual situation, and the first distance and the second distance can be the same or different. In some embodiments, in the example shown in FIG. 3A, the first distance may be 1 to 3 times the width of the first keyword character region AA in the direction P2, and the second distance may be 1 to 3 times the width of the third keyword character region CC in the direction P2. In the example shown in FIG. 3B, the first distance may be 1 to 3 times the width of the first keyword character region AA in the direction P1, and the second distance may be 1 to 3 times the width of the third keyword character region CC in the direction P1.

It should be noted that, in the embodiment of the disclosure, the "arrangement direction of the N keyword character regions" can mean: in the rectangular coordinate system P1-P2 shown in FIG. 3A and FIG. 3B (for example, the rectangular coordinate system established based on the receipt image), if the angle between the approximate line corresponding to the N centers of the N keyword character regions and the P1-axis is greater than the angle between the approximate line corresponding to the N centers of the N keyword character regions and the P2-axis, the arrangement direction of the N keyword character regions is the direction P2. If the angle between the approximate line corresponding to the N centers of the N keyword character regions and the P2-axis is greater than the angle between the approximate line corresponding to the N centers of the N keyword character regions and the P1-axis, the arrangement direction of the N keyword character regions is the direction P1.

For example, as shown in FIG. 3A, the connection line between the center of the first keyword character region AA, the center of the second keyword character region BB, and the center of the third keyword character region CC is parallel to the direction P2. Therefore, if the angle (90°) between the approximate line corresponding to the center of the first keyword character region AA, the center of the second keyword character region BB, and the center of the third keyword character region CC and the P1-axis is greater than the angle (0°) between the approximate line corresponding to the center of the first keyword character region AA, the center of the second keyword character region BB, and the center of the third keyword character region CC and the P2-axis, the arrangement direction of the first keyword character region AA, the second keyword character region BB, and the third keyword character region CC is the direction P2.

For example, as shown in FIG. 3B, the connection line between the center of the first keyword character region AA, the center of the second keyword character region BB, and the center of the third keyword character region CC is parallel to the direction P1. Therefore, if the angle (0°) between the approximate line corresponding to the center of the first keyword character region AA, the center of the second keyword character region BB, and the center of the third keyword character region CC and the P1-axis is greater than the angle (90°) between the approximate line corresponding to the center of the first keyword character region AA, the center of the second keyword character region BB, and the center of the third keyword character region CC and the P2-axis, the arrangement direction of the first keyword character region AA, the second keyword character region BB, and the third keyword character region CC is the direction P1.

For example, in the arrangement direction of the N keyword character regions, the N keyword character regions may at least partially overlap each other. As can be seen from FIG. 3A, in the direction P2, the first keyword character region AA, the second keyword character region BB and the third keyword character region CC completely overlap each other. As can be seen from FIG. 3B, in the direction P1, the first keyword character region AA, the second keyword character region BB and the third keyword character region CC completely overlap each other.

For example, in some embodiments, N and/or M are greater than or equal to 2, and step S133 includes: determining a plurality of score calculating groups according to the N keyword character regions and M candidate character regions; calculating a plurality of scores corresponding to the plurality of score calculating groups based on the distance and deviation angle between the N keyword character regions and the M candidate character regions, and determining the score calculating group corresponding to the highest score among the plurality of scores as the target score calculating group; determining the Q character contents corresponding to the N preset keywords according to the corresponding relationship between the N keyword character regions and the M candidate character regions represented by the target score calculating group.

Figure 4A:
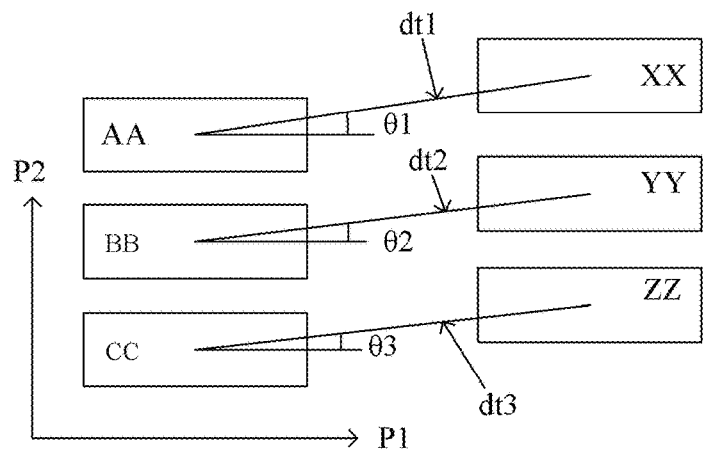
FIG. 4A is a schematic diagram of a score calculating group provided by at least one embodiment of the disclosure.
Figure 4B:
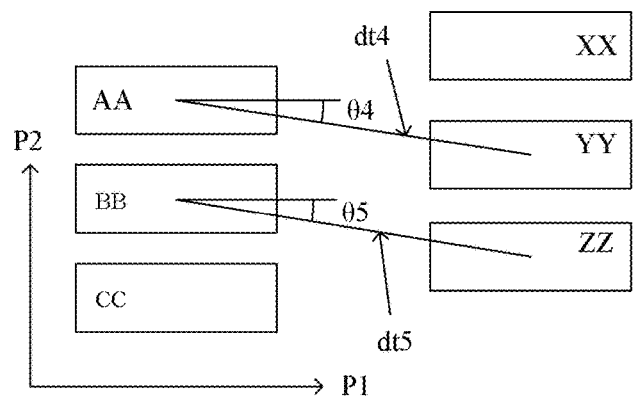
FIG. 4B is a schematic diagram of another score calculating group provided by at least one embodiment of the disclosure.
Figure 4C:
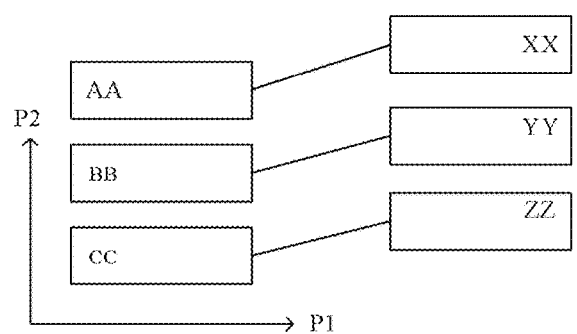
FIG. 4C is a schematic diagram of still another score calculating group provided by at least one embodiment of the disclosure.

FIG. 4A is a schematic diagram of a score calculating group provided by at least one embodiment of the disclosure. FIG. 4B is a schematic diagram of another score calculating group provided by at least one embodiment of the disclosure. FIG. 4C is a schematic diagram of still another score calculating group provided by at least one embodiment of the disclosure.

For example, as shown in FIG. 4A to FIG. 4C, in some embodiments, N and M are both 3, that is, the receipt image includes three keyword character regions and three candidate character regions. The three keyword characters regions are the first keyword character region AA, the second keyword character region BB, and the third keyword character region CC respectively. The three candidate character regions are the first candidate character region XX, the second candidate character region YY and the third candidate character region ZZ respectively. The arrangement direction of the first keyword character region AA, the second keyword character region BB, and the third keyword character region CC is the direction P2. The arrangement direction of the first candidate character region XX, the second candidate character region YY and the third candidate character region ZZ is also the direction P2.

For example, in some receipts, an item quantity is simultaneously shown below and on the right side of the item, and therefore the candidate character region corresponding to each keyword character region is located on the right side or/and the lower side of each keyword character region. If the characters in a certain region below the keyword character region are all letters, Chinese characters, etc., then it is determined that the value corresponding to the keyword character region is in a certain region on the right side. If the characters in a certain region below the keyword character region include digits, and the characters in a certain region on the right side of the keyword character region also include digits, then the digit regions below and on the right side of the keyword character region can be used as the candidate character region of the keyword character region.

For example, each score calculating group represents a corresponding relationship between N keyword character regions and M candidate character regions. It should be noted that in some corresponding relationships, part of the keyword character regions in the N keyword character regions may not have corresponding candidate character regions.

For example, there is no intersection in the corresponding relationship between the N keyword character regions and the M candidate character regions. That is, for example, in the example shown in FIG. 4B, in a corresponding relationship, the first keyword character region AA corresponds to the second candidate character region YY, and the second keyword character region BB corresponds to the third candidate character region ZZ. Under the circumstances, there is no candidate character region corresponding to the third keyword character region CC. It is worth noting that under the circumstances, because the connection line between the third keyword character region CC and the first candidate character region XX intersects the connection line between the first keyword character region AA and the second candidate character region YY as well as the connection line between the second keyword character region BB and the third candidate character region ZZ, that is, there is an intersection in the corresponding relationship between the N keyword character regions and the M candidate character regions, the third keyword character region CC cannot correspond to the first candidate character region XX.

For example, in the examples shown in FIG. 4A to FIG. 4C, there may be a plurality of corresponding relationships between the three keyword character regions and the three candidate character regions, that is, there may be a plurality of score calculating groups. For example, as shown in the corresponding relationships in FIG. 4A and FIG. 4C: the first keyword character region AA corresponds to the first candidate character region XX, the second keyword character region BB corresponds to the second candidate character region YY, and the third keyword character region CC corresponds to the third candidate character region ZZ. As shown in the corresponding relationship in FIG. 4B: the first keyword character region AA corresponds to the second candidate character region YY, the second keyword character region BB corresponds to the third candidate character region ZZ, and there is no candidate character region corresponding to the third keyword character region CC. There may be other corresponding relationships as follows: the first keyword character region AA corresponds to the third candidate character region ZZ, and there is no candidate character region corresponding to the second keyword character region BB and the third keyword character region CC; there is no candidate character region corresponding to the first keyword character region AA, the second keyword character region BB corresponds to the first candidate character region XX, and the third keyword character region CC corresponds to the second candidate character region YY and so on. They are not intended to be exhaustive or to limit the disclosure to the precise forms disclosed, as long as there is no intersection in the corresponding relationship between the N keyword character regions and the M candidate character regions.

It should be noted that, in the embodiments of the disclosure, the connection line between two regions can mean the connection line between the centers of the two regions, or can mean the connection line between the midpoints of two sides of the two regions close to each other. As shown in FIG. 4A, the connection line between the first keyword character region AA and the first candidate character region XX is the connection line between the center of the first keyword character region AA and the center of the first candidate character region XX. As shown in FIG. 4C, the connection line between the first keyword character region AA and the first candidate character region XX is the connection line between the midpoint on a side of the first keyword character region AA close to the first candidate character region XX and the midpoint of the first candidate character region XX close to the first keyword character region AA.

For example, the step of calculating the plurality of scores corresponding to the plurality of score calculating groups includes: for each score calculating group in the plurality of score calculating groups, calculating N scores corresponding to the N keyword character regions according to the distance and the deviation angle between the N keyword character regions and the candidate character regions corresponding to the N keyword character regions in the score calculating group, wherein in the score calculating group, the greater the distance between the connection line between the center of each keyword character region and the center of its corresponding candidate character region, the smaller the score corresponding to each keyword character region. The deviation angle between each keyword character region and its corresponding candidate character region represents the angle between the connection line between the center of each keyword character region and the center of its corresponding candidate character region and the preset direction. The smaller the deviation angle between each keyword character region and its corresponding candidate character region, the greater the score corresponding to each keyword character region. The N scores are summed to obtain the score corresponding to the score calculating group, thereby obtaining the plurality of scores corresponding to the plurality of score calculating groups.

For example, for the score calculating group shown in FIG. 4A, the distance of the connection line between the first keyword character region AA and the first candidate character region XX is dt1, the distance of the connection line between the second keyword character region BB and the second candidate character region YY is dt2, and the distance of the connection line between the third keyword character region CC and the third candidate character region ZZ is dt3. If dt1 is greater than dt2 and dt1 is less than dt3, the score corresponding to the first keyword character region AA is smaller than the score corresponding to the second keyword character region BB, and the score corresponding to the first keyword character region AA is greater than the score corresponding to the third candidate character region ZZ.

For example, for the score calculating group shown in FIG. 4B, the distance of the connection line between the first keyword character region AA and the second candidate character region YY is dt4, and the distance of the connection line between the second keyword character region BB and the third candidate character region ZZ is dt5. If dt4 is greater than dt5, the score corresponding to the first keyword character region AA is smaller than the score corresponding to the second keyword character region BB.

For example, the preset direction may be a horizontal direction or a vertical direction. In some embodiments, the horizontal direction may be the direction P1 shown in FIG. 4A to FIG. 4C, and the vertical direction may be the direction P2 shown in FIG. 4A to FIG. 4C.

For example, the preset direction is the horizontal direction. For the score calculating group shown in FIG. 4A, the deviation angle between the first keyword character region AA and the first candidate character region XX relative to the preset direction is $\theta1$, the deviation angle between the second keyword character region BB and the second candidate character region YY relative to the preset direction is $\theta2$, and the deviation angle between the third keyword character region CC and the third candidate character region ZZ relative to the preset direction is $\theta3$. If $\theta1$ is greater than $\theta2$ and $\theta1$ is less than $\theta3$, the score corresponding to the first keyword character region AA is less than the score corresponding to the second keyword character region BB, and the score corresponding to the first keyword character region AA is greater than the score corresponding to the third candidate character region ZZ.

For example, the preset direction is the horizontal direction. For the score calculating group shown in FIG. 4B, the deviation angle between the first keyword character region AA and the second candidate character region YY relative to the preset direction is $\theta4$, and the deviation angle between the second keyword character region BB and the third candidate character region ZZ relative to the preset direction is $\theta5$. If $\theta4$ is greater than $\theta5$, the score corresponding to the first keyword character region AA is smaller than the score corresponding to the second keyword character region BB.

It should be noted that the score corresponding to the keyword character region needs to be calculated in combination with the distance and the deviation angle, so that the accuracy of the calculated score corresponding to the keyword character region can be improved.

For example, in some embodiments, for the score calculating group shown in FIG. 4A, the score corresponding to the first keyword character region AA is 0.8, the score corresponding to the second keyword character region BB is 0.8, and the score corresponding to the third keyword character region CC is 0.8. Based on the above, the score corresponding to the score calculating group shown in FIG. 4A is 2.4 (0.8+0.8+0.8). For the score calculating group shown in FIG. 4B, the score corresponding to the first keyword character region AA is 0.9, the score corresponding to the second keyword character region BB is 0.9, and the score corresponding to the third keyword character region CC is 0. Based on the above, the score corresponding to the score calculating group shown in FIG. 4B is 1.8 (0.9+0.9+0). Since the score corresponding to the score calculating group shown in FIG. 4A is higher than the score corresponding to the score calculating group shown in FIG. 4B, in the embodiment shown in FIG. 4A and FIG. 4B, the score calculating group shown in FIG. 4A is the target score calculating group.

For example, according to the corresponding relationship between the three keyword character regions and the three candidate character regions represented by the target score calculating group shown in FIG. 4A, it can be determined that the target character region corresponding to the three keyword character regions is the three candidate character regions, namely the target character region corresponding to the first keyword character region AA is the first candidate character region XX, the target character region corresponding to the second keyword character region BB is the second candidate character region YY, and the target character region corresponding to the third keyword character region CC is the third candidate character region ZZ. Therefore, it can be determined that the character content corresponding to the keywords in the three keyword character regions is the character content in the three candidate character regions, that is, the character content corresponding to the keywords in the first keyword character region AA is the character content in the first candidate character region XX, the character content corresponding to the keywords in the second keyword character region BB is the character content in the second candidate character region YY, and the character content corresponding to the keywords in the third keyword character region CC is the character content in the third candidate character region ZZ.

Figure 5A:
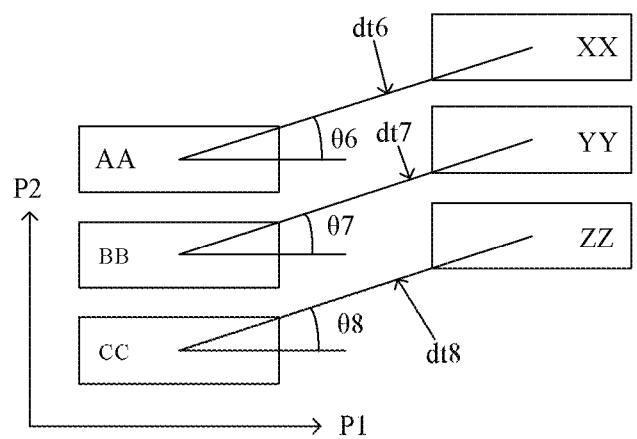
FIG. 5A is a schematic diagram of a score calculating group provided by at least another embodiment of the disclosure.
Figure 5B:
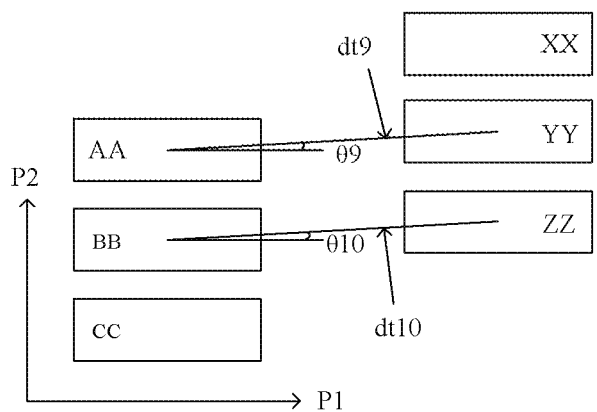
FIG. 5B is a schematic diagram of yet another a score calculating group provided by at least another embodiment of the disclosure.

FIG. 5A is a schematic diagram of a score calculating group provided by at least another embodiment of the disclosure. FIG. 5B is a schematic diagram of yet another a score calculating group provided by at least another embodiment of the disclosure.

For example, the corresponding relationship shown in FIG. 5A is: the first keyword character region AA corresponds to the first candidate character region XX, the second keyword character region BB corresponds to the second candidate character region YY, and the third key character region CC corresponds to the third candidate character region ZZ. The corresponding relationship shown in FIG. 5B is: the first keyword character region AA corresponds to the second candidate character region YY, the second keyword character region BB corresponds to the third candidate character region ZZ, and there is no candidate character region corresponding to the third keyword character region CC.

For example, the preset direction is the horizontal direction. For the score calculating group shown in FIG. 5A, the distance of the connection line between the first keyword character region AA and the first candidate character region XX is dt6, the distance of the connection line between the second keyword character region BB and the second candidate character region YY is dt7, and the distance of the connection line between the third keyword character region CC and the third candidate character region ZZ is dt8. The deviation angle between the first keyword character region AA and the first candidate character region XX relative to the preset direction is θ6, the deviation angle between the second keyword character region BB and the second candidate character region YY relative to the preset direction is θ7, and the deviation angle between the third keyword character region CC and the third candidate character region ZZ relative to the preset direction is θ8.

For example, the preset direction is the horizontal direction. For the score calculating group shown in FIG. 5B, the distance of the connection line between the first keyword character region AA and the second candidate character region YY is dt9, and the distance of the connection line between the second keyword character region BB and the third candidate character region ZZ is dt10. The deviation angle of the first keyword character region AA and the second candidate character region YY relative to the preset direction is θ9, and the deviation angle between the second keyword character region BB and the third candidate character region ZZ relative to the preset direction is θ10.

For example, both θ9 and θ10 are smaller than any one of θ6, θ7, and θ8, and dt9 and dt10 are both smaller than any one of dt6, dt7, and dt8. For the score calculating group shown in FIG. 5A, the score corresponding to the first keyword character region AA is 0.4, the score corresponding to the second keyword character region BB is 0.4, and the score corresponding to the third keyword character region CC is 0.4. Based on the above, the score corresponding to the score calculating group shown in FIG. 4A is 1.2 (0.4+0.4+0.4). For the score calculating group shown in FIG. 5B, the score corresponding to the first keyword character region AA is 1.1, the score corresponding to the second keyword character region BB is 1.1, and the score corresponding to the third keyword character region CC is 0. Based on the above, the score corresponding to the score calculating group shown in FIG. 5B is 2.2 (1.1+1.1+0). Since the score corresponding to the score calculating group shown in FIG. 5A is lower than the score corresponding to the score calculating group shown in FIG. 5B, in the embodiment shown in FIG. 5A and FIG. 5B, the score calculating group shown in FIG. 5B is the target score calculating group.

For example, according to the corresponding relationship between the three keyword character regions and the three candidate character regions represented by the target score calculating group shown in FIG. 5B, it can be determined that the target character regions corresponding to the three keyword character regions are the second candidate character region YY and the third candidate character region ZZ, that is, the target character region corresponding to the first keyword character region AA is the second candidate character region YY, the target character region corresponding to the second keyword character region BB is the third candidate character region ZZ, and there is no target character region corresponding to the third keyword character region CC. Accordingly, it can be determined that the character content corresponding to the keywords in the three keyword character regions is the character content in the second candidate character region YY and the third candidate character region ZZ, that is, the character content corresponding to the keywords in the first keyword character region AA is the character content in the second candidate character region YY, the character content corresponding to the keywords in the second keyword character region BB is the character content in the third candidate character region ZZ, and there is no character content corresponding to the keywords in the third keyword character region CC.

For example, when N and M are both equal to 1, in some embodiments, in step S133, the character content in the candidate character region corresponding to the keyword in the keyword character region may be directly output. Alternatively, after the character content in the candidate character region is directly output, the candidate character region is cut, and the candidate character region image after cutting is output for the user to compare.

For example, in the case that N and M are both equal to 1, in other embodiments, step S133 may also include: calculating scores corresponding to the N keyword character regions according to the distance and the deviation angle between the N keyword character regions and the M candidate character regions; determining whether the score corresponding to the N keyword character regions is greater than the preset score, when the score corresponding to the N keyword character regions is greater than or equal to the preset score, it is determined that the Q target character regions corresponding to the N keyword character regions are the M candidate character regions; when the score corresponding to the N keyword character regions is greater than or equal to the preset score, it is determined that there is no target character region corresponding to the N keyword character regions. For example, when there are only one keyword character region and one candidate character region, the score corresponding to the keyword character region can be calculated according to the distance and deviation angle between the keyword character region and the candidate character region. When the score corresponding to the keyword character region is greater than or equal to the preset score, it is determined that the target character region corresponding to the keyword character region is the candidate character region. When the score corresponding to the N keyword character regions is less than a preset score, it is determined that there is no target character region corresponding to the keyword character region, that is, the candidate character region does not correspond to the keyword character region.

For example, the preset score can be set by the user according to the actual situation, and the disclosure provides no limitation to the specific value of the preset score.

For example, the N preset keywords include an amount keyword. Step S134 may include: converting the preset keywords into a phrase to be queried, selecting the target amount determining rule corresponding to the phrases to be queried in the rule database, wherein the rule database stores a plurality of different phrases to be queried and the amount determining rules corresponding to the plurality of phrases to be queried; determining the amount keyword among the N preset keywords according to the target amount determining rule; determining the character content corresponding to the amount keyword in the Q character contents according to the amount keyword; determining an item quantity according to the character content corresponding to the amount keyword.

For example, the character content corresponding to the amount keyword is an item quantity.

For example, the step of converting the N preset keywords into the phrases to be queried includes arranging the N preset keywords into phrases to be queried in sequence according to their initial letter.

For example, the N preset keywords are arranged and combined to obtain the phrases to be queried. For example, the arrangement and combination may be carried out according to the initial letters of the preset keywords. For example, the preset keywords contained in a certain receipt are subtotal, tax, and total, and the phrase to be queried obtained according to the arrangement and combination of the initial letters in sequence is "subtotal-tax-total". For receipts recorded in Chinese, the phrase to be queried can be formed by sequentially arranging the initial letters of the brief Chinese spelling in the N preset keywords. For example, the preset keywords are "xiǎojì (小计, which is translated as "subtotal" in English), shuì (税, which is translated as "tax" in English) and zǒngjì (总计, which is translated as "total" in English)" in Chinese, and the phrase to be queried obtained through arrangement and combination of the initial letters of the brief Chinese spelling in sequence is "shuì-xiǎojì-zǒngjì (税-小计-总计, which is translated as "tax-subtotal-total" in English)" in Chinese.

For example, in some embodiments of the disclosure, the amount keyword may be a keyword corresponding to the payment amount, and an item quantity may be the payment amount. The amount determining rule stored in the rule database may be: designating a preset keyword in the phrase to be queried, so that the amount value corresponding to the preset keyword is used as the payment amount corresponding to the receipt to be identified. Therefore, the step of determining the payment amount can include: determining the preset keyword specified by the target amount determining rule as the amount keyword; then, determining the character content corresponding to the amount keyword according to the amount keyword; finally, using the character content corresponding to the amount keyword as the payment amount corresponding to the receipt to be identified.

For example, a phrase in the rule database is "subtotal-tax-total", and the corresponding amount determining rule is set to select the amount value corresponding to the preset keyword "total" as the payment amount. If the phrase to be queried is also "subtotal-tax-total", then the target amount determining rule is to select the amount value corresponding to the preset keyword "total" as the payment amount. Therefore, the character content corresponding to the preset keyword "total" among the Q character contents is used as the payment amount. In another example, a phrase in the rule database is "subtotal-tax-total-visa", and the corresponding amount determining rule is set to select the amount value corresponding to the preset keyword visa as the payment amount. If the phrase to be queried is also "subtotal-tax-total-visa", then the target amount determining rule is to select the amount value corresponding to the preset keyword visa as the payment amount. Therefore, the character content corresponding to the preset keyword visa in the Q character content is used as the payment amount. For example, some phrases to be queried and their corresponding amount determining rules include: the phrase to be queried is "gratuity-purchase-total", the keyword determined by the amount determining rule is total; the phrase to be queried is "credit-fuel total", and the keyword determined by the amount determining rule is "credit".

For example, in some embodiments, the receipt information also includes the item name. Step 13 also includes: using a text classification identification model to classify the plurality of character contents, so as to determine at least one candidate item name; and determining the item name corresponding to the receipt to be identified according to the at least one candidate item name.

For example, the text classification identification model may be a neural network model obtained by pre-training. After identifying the plurality of character contents on the receipt to be identified, the plurality of character contents can be input into the text classification identification model, so that the plurality of character contents can be classified and identified through the text classification identification model, so as to obtain the candidate item name corresponding to the item name, and then the item name corresponding to the receipt to be identified can be determined based on the candidate item name.

It should be noted that in the embodiments of the disclosure, the text classification identification model performs text classification mainly for each line of characters, so that the category of each line of characters can be determined. For example, it can be determined that each line of characters is the text related to amount, the text related to the item address, or the text related to the item name and so on. Accordingly, the subsequent extraction or matching of related content can be carried out to determine the candidate range of the amount/item address/item name. For example, in some embodiments, each character content corresponds to a row of character regions, so that each character content is a row of characters, that is, the text classification identification model classifies each row of characters.

For example, in some embodiments, the step of determining the item name corresponding to the receipt to be identified based on the at least one candidate item name includes: sorting the at least one candidate item name to determine at least one candidate item name group, wherein all candidate item names in each candidate item name group in the at least one candidate item name group are the same; determining the target candidate item name group according to the at least one candidate item name group, wherein the number of candidate item names in the target candidate item name group is more than the number of candidate item names in any of the remaining candidate item name groups in the at least one candidate item name group; and using the candidate item name corresponding to the target candidate item name group as the item name. When the number of identified candidate item names on the receipt to be identified is greater than the number of any other candidate item names, the candidate item name is likely to be the item name corresponding to the receipt to be identified.

For example, when only one candidate item name is obtained through the text classification identification model, the candidate item name can be directly output as the item name corresponding to the receipt to be identified. In the circumstances where the plurality of candidate item names are obtained through the text classification identification model, the largest number of identical candidate item names among the plurality of candidate item names are determined as the item name according to a sorting method, and then the candidate item name is output.

For example, in some examples, in step S13, W candidate item names can be obtained, wherein W is an integer greater than or equal to 2. When W is greater than or equal to 3, if (W−1) candidate item names among the W candidate item names are the same, any of the candidate item names among the same (W−1) candidate item names is determined as the item name. Alternatively, when W is 2, if W candidate item names are the same, any of the candidate item names among the same W candidate item names is determined as the item name. If the W candidate item names are different from each other, all the candidate item names can be output to be determined by the user.

For example, in other embodiments, the step of determining the item name corresponding to the receipt to be identified according to the at least one candidate item name includes: determining the item name from the at least one candidate item name based on the item name statistics table.

For example, in some embodiments, the item name may be a store name, and accordingly, the item name statistics table is a store name statistics table. In another example, the item name can also be a supplier, a brand, etc.

For example, the item name is recorded in the item name statistics table, and the statistics amount of the item name in the item name statistics table is higher than the statistics amount of any of the remaining candidate item names in the at least one candidate item name. The item name statistics table may be obtained by statistically recording the item name corresponding to each receipt in the previous process of identifying the receipt. If an identified candidate item name among the at least one candidate item name appears in the item name statistics table, the candidate item name is likely to be the item name corresponding to the receipt to be identified, and thus can be selected as the item name corresponding to the receipt to be identified.

For example, in some embodiments, the receipt information further includes the item address. Step S13 further includes: using a text classification identification model to classify the plurality of character contents to determine at least one candidate item address; and determining an item address corresponding to the receipt to be identified based on the at least one candidate item address.

For example, in some embodiments, the step of determining the item address corresponding to the receipt to be identified according to the at least one candidate item address includes: sorting the at least one candidate item address to determine the at least one candidate item address group, wherein all the candidate item addresses in each candidate item address group in the at least one candidate item address group are the same; determining the target candidate item address group according to the at least one candidate item address group, wherein the number of candidate item addresses among the target candidate item address group is more than the number of the candidate item addresses in any of the remaining candidate item address groups among the at least one candidate item address group; using the candidate item address corresponding to the target candidate item address group as the item address.

That is to say, firstly, at least one candidate item address can be divided into the plurality of candidate item address groups, wherein all the candidate item addresses in each candidate item address group are the same. Then, the largest number of candidate item addresses corresponding to the candidate item address group among the plurality of candidate item address groups are used as the item addresses. When the number of a candidate item address identified on the receipt to be identified is more than the number of any of the remaining candidate item addresses, the candidate item address is likely to be the item address corresponding to the receipt to be identified.

For example, in the case that only one candidate item address is obtained through the text classification identification model, the candidate item address can be directly output as the item address corresponding to the receipt to be identified. In the case where the plurality of candidate item addresses are obtained through the text classification identification model, the largest number of identical candidate item addresses among the plurality of candidate item addresses are determined as the item addresses in a sorting method, then the candidate item address is output as the item address corresponding to the receipt to be identified.

For example, in some examples, in step S13, T candidate item addresses can be obtained, where T is an integer greater than or equal to 2. When T is greater than or equal to 3, if (T−1) candidate item addresses among the T candidate item addresses are the same, any candidate item address among the same (T−1) candidate item addresses is determined as the item address. Or, when T is 2, if the T candidate item addresses are the same, any candidate item address among the same T candidate item addresses is determined as the item address. If the T candidate item addresses are different from each other, all the candidate item addresses can be output to be determined by the user.

For example, in other embodiments, the step of determining the item address corresponding to the receipt to be identified based on the at least one candidate item address includes: determining the item address from the at least one candidate item address based on the item address statistics table. For example, the item address is recorded in the item address statistics table, and the statistics amount of the item address in the item address statistics table is higher than the statistics amount of any of the remaining candidate item addresses among the at least one candidate item address.

For example, in some embodiments, the item address may be a store address, and accordingly, the item address statistics table is a store address statistics table.

For example, the item address is recorded in the item address statistics table, and the statistics amount of the item address in the item address statistics table is higher than the statistics amount of any of the remaining candidate item addresses among the at least one candidate item address. The item address statistics table may be the statistics table obtained by statistically recording the item address corresponding to each receipt in the previous process of identifying the receipt. If an identified candidate item address among the at least one candidate item address appears in the item name statistics table, then the candidate item address is more likely to be the item address corresponding to the receipt to be identified, thus to be selected as the item address corresponding the receipt to be identified.

It should be noted that the item name statistics table and the item address statistics table can be two separate statistics tables, or can be integrated into one statistics table.

Therefore, in the receipt identification method provided by the embodiment of the disclosure, the text classification identification model is used to classify and identify all the character contents in the receipt to be identified, and the item name and item address have been determined. When the receipt to be identified is partially incomplete or covered, it is possible to identify the item name and item address corresponding to the receipt to be identified, so that the identification accuracy of the item name and item address can be improved.

For example, when the receipt information also includes the item name, step S13 further includes: using a text classification identification model to classify a plurality of character contents to determine at least one first candidate item name; determining at least one second candidate item name by searching in the item name database according to the plurality of character contents; determining the item name corresponding to the receipt to be identified based on the at least one first candidate item name and the at least one second candidate item name.

For example, first, at least one first candidate item name and at least one second candidate item name can be sorted to determine at least one candidate item name group, wherein all candidate item names in each candidate item name group in the at least one candidate item name group are the same. Then, the target candidate item name group is determined according to the at least one candidate item name group, wherein the number of the candidate item name groups in the target candidate item name group is more than the number of the candidate item names in any of the remaining candidate item name groups in the at least one candidate item name group. The candidate item name corresponding to the target candidate item name group is used as the item name corresponding to the receipt to be identified.

In the embodiments of the disclosure, different methods can be used to determine the item name, and then the item names determined by the different methods can be determined comprehensively, so as to determine the item name corresponding to the receipt to be identified, and further improve the identification accuracy of the item name.

For example, when the receipt to be identified contains a pattern, the item name can be determined through the pattern. Under the circumstances, the step of determining the at least one second candidate item name by searching in the item name database based on the plurality of character contents includes identifying the pattern region where the pattern in the receipt image is located by using the region identification model; determining whether there is an item pattern matching the pattern in the item name database according to the pattern region, if there is an item pattern matching the pattern in the item name database, the item name corresponding to the item pattern matching the pattern is determined as the at least one second candidate item name, if there is no item pattern matching the pattern in the item name database, the step of determining whether there is a character in the pattern region is carried out, if there is a character in the pattern region, the pattern character in the pattern region is identified, and used as the at least one second candidate item name according to the identified pattern character; if there is no character in the pattern region, the item address is determined according to the plurality of character contents, and the item address is determined as the at least one second candidate item name.

For example, each item pattern in the item name database is marked with a corresponding item name.

For example, as shown in FIG. 2A, "Hudson News" at the top of the receipt to be identified is an image; as shown in FIG. 2B, "ingles" at the top of the receipt to be identified is an image.

For example, each item name is pre-stored in the item name database, and the character content in each character region will be searched in the item name database one by one. If the character content in a certain character region can be found in the item name database, then the item name searched in the item name database is used as the second candidate item name. If the character content in the plurality of character regions cannot be found in the item name database, that is, the item name database does not include the character content in any one of the plurality of character regions, then the item address can be determined from the character content of the plurality of character regions, and the item address is used as the second candidate item name.

It should be noted that for the detailed description of determining the first candidate item name, please refer to the related description regarding determining the candidate item name according to the text classification identification model, and no further description will be incorporated herein.

For example, the item name database can be a store name database.

For example, in this embodiment, the item address is determined in the following ways. 1. If a preset character for identifying the address appears in a certain character region, such as "location", "address", "add.", etc., it can be determined that the characters following these preset characters are address information. 2. If the characters corresponding to the administrative region name or street name number appear, these characters are address information.

When determining the item address as the item name, the address information used to indicate a smaller region in the item address can be adopted as the item name. For example, information regarding the street+number or building+floor room number in the item address can be selected as the item name, the address information used to indicate a smaller region can be the address information of the smallest or smallest two-level region in the administrative region name, which is generally the last part of a Chinese address or the character in the first part of an English address. For example, if the item address information includes No. 10 Nanjing East Road, "No. 10 Nanjing East Road" is selected as the item name. If the item address information includes Raffles City 702, "Raffles City 702" is selected as the item name. If the item address information contains "XX mall shop 601", "XX mall shop 601" is selected as the item name. The address information used to indicate a larger region in the item address information is not included in the item name in order to keep the item name short. For example, if the item address information includes No. 10 Nanjing East Road, Huangpu District, Shanghai, then "Huangpu District, Shanghai" is omitted, only "No. 10 Nanjing East Road" is adopted as the item name, so that the item name can be simplified.

It should be noted that if there is an item pattern in the item name database that matches the pattern in the receipt to be identified, the item name corresponding to the matching item pattern is determined as the second candidate item name, and the candidate item name is determined not according to the character in the pattern or the item address, or the candidate item name determined according to the character in the pattern and the candidate item name determined according to the item address are discarded. If there is no item pattern in the item name database that matches in the pattern in the receipt to be identified, but the characters in the pattern can be identified, the character in identified pattern is used as the second candidate item name; likewise, the candidate item name is determined not according to the item address, or the candidate item name determined according to the item address is discarded. If there is no item pattern in the item name database that matches the pattern in the receipt to be identified, and there is no character in the pattern or the character in the pattern cannot be identified, the item address is determined according to the character contents in the plurality of character regions, and the item address is adopted as the second candidate item name, and the item name corresponding to the receipt to be identified is determined according to the first candidate item name and the second candidate item name. In this manner, the reliability of identification of the item name can be further improved.

It should be noted that if the item name cannot be found in the item name database based on the pattern, plus there is no character in the pattern, and the item name cannot be found in the item name database based on the character content in the plurality of character regions, the item address can be determined from the character content in the plurality of regions, and the item address is adopted as the second candidate item name.

For example, if the first candidate item name and the second candidate item name are the same, then any of the first candidate item name and the second candidate item name is selected as the item name corresponding to the receipt to be identified. If the first candidate item name and the second candidate item name are different, then the item name corresponding to the receipt to be identified is determined according to the score of the first candidate item name and the score of the second candidate item name. Or, the first candidate item name and the second candidate item name can be output simultaneously to be determined by the user.

In the embodiments of the disclosure, judgment can be made by taking into comprehensive consideration of the candidate item name obtained through the text classification identification model, the data in the item name statistics table, the candidate item name corresponding to the logo image on the receipt, and the candidate item name corresponding to the identified item address in the database or map, thereby determining the final item name corresponding to the receipt to be identified.

For example, when determining the item name of the receipt to be identified, the weight of the first candidate item name is greater than the weight of the second candidate item name. The weight of the second candidate item name corresponding to the item pattern that matches the pattern in the receipt to be identified is greater than the weight of the second candidate item name determined based on the characters in the pattern in the receipt to be identified. The weight of the second candidate item name determined based on the characters in the pattern in the receipt to be identified is greater than the weight of the second candidate item name determined based on the item address.

For example, the score of each candidate item name can be determined according to the weight of at least one first candidate item name and the weight of at least one second candidate item name, and the candidate item name with the highest score is used as the item name corresponding to the receipt to be identified. In some embodiments, the at least one first candidate item name includes a first candidate item name P1, a first candidate item name P2, and a first candidate item name P3, and the at least one second candidate item name includes a second candidate item name P1'. Specifically, the first candidate item name P1 and the second candidate item name P1' are the same candidate item names, the weight of the first candidate item name P1 is pp1, the weight of the first candidate item name P2 is pp2, the weight of the first candidate item name P3 is pp3, and the weight of the second candidate item name P1' is pp4, wherein pp4 is smaller than any one of pp1, pp2, and pp3. The scores ultimately corresponding to the first candidate item name P1 and the second candidate item name P1' can be pp1+pp4, the score corresponding to the first candidate item name P2 can be pp2, and the score corresponding to the first candidate item name P3 can be pp3. If (pp1+pp4) is greater than pp2 and also greater than pp3, then the first candidate item name P1 or the second candidate item name P1' are adopted as the item name of the receipt to be identified.

For example, when the receipt information further includes the item address, step S13 further includes: using a text classification identification model to classify the plurality of character contents to determine at least one first candidate item address. If a preset character used to mark an address appears in one character region in the plurality of character regions, then the character following the preset character is used as at least one second candidate item address; and/or, if a character corresponding to the administrative region name or street name appears in one character region in the plurality of character regions, then the character corresponding to the administrative region name or street name is taken as at least one second candidate item address. The item address corresponding to the receipt to be identified is determined according to the at least one first candidate item address and the at least one second candidate item address. It should be noted that the second candidate item address can also be determined based on the identified item name.

In the embodiments of the disclosure, different methods can be used to determine the item address, and then the judgment can be made by taking into comprehensive consideration of the item address determined by different methods, thereby determining the item address corresponding to the receipt to be identified, and further improving the identification accuracy of the item address.

For example, first, at least one first candidate item address and at least one second candidate item address can be sorted to determine at least one candidate item address group, wherein all the candidate item addresses in each candidate item address group in the at least one candidate item address group are the same. Then, the target candidate item address group is determined based on at least one candidate item address group, wherein the number of candidate item addresses in the target candidate item address group is more than the number of candidate item addresses in any of the remaining candidate item address groups in at least one candidate item address group. The candidate item address corresponding to the target candidate item address group is used as the item address corresponding to the receipt to be identified.

For example, if the first candidate item address and the second candidate item address are the same, then any one of the first candidate item address and the second candidate item address is selected as the item address corresponding to the receipt to be identified. If the first candidate item address and the second candidate item address are different, the first candidate item address and the second candidate item address can be output simultaneously to be determined by the user.

It should be noted that the above method of determining the item name based on the first candidate item name and the second candidate item name is applicable for determining the item address based on the first candidate item address and the second candidate item address if there is no contradiction, and no further description will be incorporated herein.

For example, in some embodiments, the receipt information may also include time information. With regard to time information, the time information displayed on the receipt usually adopts a certain time format, that is, the time information conforms to certain time characteristics, such as date slash, date in English character, and so on. For example, the time information displayed on the receipt can be: "30 Jan' 18", "02/10/17", "22/11/2017", "Apr 6' 18", "Apr 4, 2018", "2018-02-02", "26 Oct 2017", "Nov. 18, 2017", "Mar 24, 2018", "01012017", etc. Based on the above, the region that meets the preset time characteristics can be found from the plurality of character regions, that is, the region (time region) where the time information is located, and then the time information corresponding to the receipt can be determined. For example, a neural network model can be used to identify the region that meets the preset time characteristics in the plurality of character regions. The neural network model is established through pre-training, and the training samples are time pictures in various formats. For example, first, in the process of identifying the plurality of character regions in the receipt image in step S12, it also includes: using a region identification model to identify the time region, and labeling the time region, wherein the time region is a region that conforms to a preset time characteristic. Then, in step S13, the time information corresponding to the receipt is determined according to the character content in the time region. For example, if the character in the time region is "2018-02-02", it can be determined that the time information corresponding to the receipt is "Feb. 2, 2018".

The following describes this embodiment with some specific examples of receipts.

With regard to the receipt to be identified as shown in FIG. 2A, the region identification model can identify the time region T1 during the process of identifying each character region, and then the identification result of the character identification model can determine the time information as 8/8/2017. For example, the text classification identification model can be used to identify the plurality of character contents that are identified, so as to determine the store name corresponding to the receipt to be identified. For example, the following "@hudson" can be found in all texts. If the receipt to be identified contains a pattern, the region identification model can further identify the region M1 where the pattern is located, and search for a matching store name pattern in the store name database based on the pattern, so as to determine the store name on the receipt to be identified. If the store name pattern matching the image on the receipt to be identified cannot be found in the store name database, the character "Hudson News" in the pattern identified by the character identification model is used as the store name. For example, if the pattern on the receipt to be identified cannot be identified, the store name can be determined according to the identified address information database. If the pattern on the receipt to be identified can be used to obtain the store name through character identification or the store name database, or the store name can be determined according to the address information database through the identified address characters, the judgment can be made by taking into comprehensive consideration of the identified store name combined with the store name determined according to the text classification identification model. It can be determined that the receipt to be identified contains the preset keywords, such as subtotal, total, cash, change, according to the character identification results in the plurality of character regions, thereby determining the plurality of keyword character regions. The score summing region is determined according to the keywords. The candidate character region corresponding to the keyword character regions is determined based on the score summing region. Scores are given based on the distance and the deviation angle between the keyword character regions and their corresponding candidate character regions, thereby determining the character content corresponding to the keywords. The keywords are converted into phrases to be queried "cash-change-subtotal-total", and the corresponding amount determining rule is searched from the rule database. If the amount determining rule found is to use the amount value corresponding to the keyword "total" as the payment amount, the character content corresponding to the keyword "total" is used as the payment amount, as shown in FIG. 2A, that is, the amount value corresponding to the keyword "total" is 2.54, that is, 2.54 is used as the payment amount.

With regard to the receipt to be identified as shown in FIG. 2B, the region identification model can identify the time region T2 in the process of identifying each character region, and then the time information can be determined as Aug. 3, 2017 through the identification result of the character identification model. For example, through the text classification identification model, the store name "ingles" can be acquired in multiple places on the receipt to be identified as shown in FIG. 2B. Furthermore, judgment can be made by taking into comprehensive consideration of the store name determined through different methods. According to the character identification results in the plurality of character regions, it can be determined that the receipt to be identified contains the preset keywords, such as TAX, BALANCE, TOTAL AMOUNT, and CHANGE, and thus the plurality of keyword character regions can be determined. The score summing region can be determined according to these keywords. The candidate character region corresponding to these keyword character regions can be determined based on the score summing region. Scores are given based on the distance and the deviation angle between the keyword character regions and their corresponding candidate character regions, thereby determining the character content corresponding to the keywords. The keywords are converted into phrases to be queried "BALANCE-CHANGE-TAX-TOTAL AMOUNT", and the corresponding amount determining rule is searched from the rule database. If the amount determining rule found is to use the amount value corresponding to the keyword "TOTAL AMOUNT" as the payment amount, the character content corresponding to the keyword "TOTAL AMOUNT" is used as the payment amount, as shown in FIG. 2B, that is, the amount value corresponding to the keyword "TOTAL AMOUNT" is 4.44, that is, 4.44 is used as the payment amount.

The training process of the region identification model, character identification model and text classification identification model will be briefly introduced below.

The region identification model can be obtained through the following training process: labeling each receipt image sample in the receipt image sample set to label each character region in each receipt image sample; training the first neural network to obtain the region identification model through the labeled receipt image sample set. When labeling each character region, the region that meets the preset time characteristics can be labeled as the time region. In this way, the region identification model trained through a large number of multiple types of time region samples can identify and label the time region while identifying each character region.

The character identification model can be obtained through the following training process: labeling each character region labeled in the training process of the region identification model to label the characters in each character region; training the second neural network through each character region that is labeled to obtain a character identification model.

The text classification identification model can be obtained through the following training process: labeling each receipt image sample in the receipt image sample set to label the location, type (store name, address, amount or other) and other content of the item name and item address corresponding to each receipt image sample on the receipt image sample; training the third neural network to obtain a text classification identification model through the receipt image sample set that is classified and labeled.

Certainly, the training set of the character identification model, the training set of the region identification model, and the training set of the text classification identification model may also be different, which are not limited in this embodiment.

Figure 6:
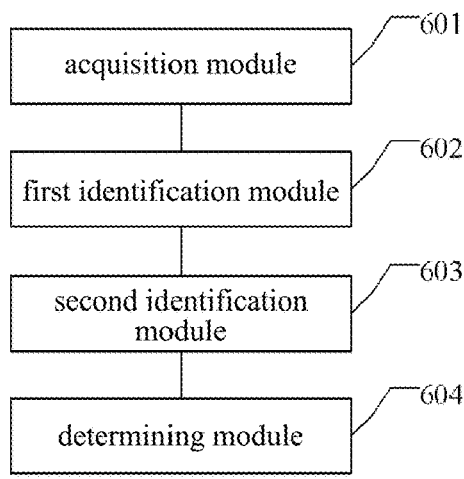
FIG. 6 is a schematic block diagram of a receipt identification apparatus provided by at least one embodiment of the disclosure.

At least one embodiment of the disclosure further provides a receipt identification apparatus. FIG. 6 is a schematic block diagram of a receipt identification apparatus provided by at least one embodiment of the disclosure.

As shown in FIG. 6, the receipt identification apparatus may include: an acquisition module 601, a first identification module 602, a second identification module 603, and a determining module 604.

For example, the acquisition module 601 is used to obtain a receipt image, wherein the receipt image includes the receipt to be identified. The first identification module 602 is configured for identifying the receipt image by using the region identification model to obtain the plurality of character regions. The second identification module 603 is configured for identifying the plurality of character regions by using a character identification model, so as to obtain the plurality of character contents corresponding to the plurality of character regions. The determining module 604 is configured for determining the receipt information corresponding to the receipt to be identified according to the plurality of character contents.

For example, the acquisition module 601, the first identification module 602, the second identification module 603, and/or the determining module 604 include codes and programs stored in memory. The processor can execute the codes and programs to achieve some or all of the functions of the acquisition module 601, the first identification module 602, the second identification module 603, and/or the determining module 604 described above. For example, the acquisition module 601, the first identification module 602, the second identification module 603, and/or the determining module 604 may be specific-purpose hardware devices to realize some or all of the functions of the acquisition module 601, the first identification module 602, the second identification module 603, and/or the determining module 604 described above. For example, the acquisition module 601, the first identification module 602, the second identification module 603, and/or the determining module 604 may be one circuit board or a combination of multiple circuit boards for implementing the functions described above. In the embodiment of the disclosure, the one circuit board or the combination of multiple circuit boards may include: (1) one or more processors; (2) one or more non-transitory memories connected to the processors; and (3) the firmware stored in the memory executable by the processor.

It should be noted that the acquisition module 601 is configured to implement step S10 shown in FIG. 1A, the first identification module 602 is configured to implement step S11 shown in FIG. 1A, the second identification module 603 is configured to implement step S12 shown in FIG. 1A, the determining module 604 is configured to implement step S13 shown in FIG. 1A. Therefore, for the specific description of the acquisition module 601, please refer to the relevant description of step S10 shown in FIG. 1A in the embodiment of the above-mentioned receipt identification method; for the specific description of the first identification module 602, please refer to the related description of step S11 shown in FIG. 1A in the embodiment of the above-mentioned receipt identification method; for the specific description of the second identification module 603, please refer to the related description of step S12 shown in FIG. 1A in the embodiment of the above-mentioned receipt identification method; and for the specific description of the determining module 604, please refer to the related description of step S13 shown in FIG. 1A in the embodiment of the above-mentioned receipt identification method. In addition, the receipt identification apparatus can achieve technical effects similar to the foregoing receipt identification method, and no further description will be incorporated herein.

Figure 7:
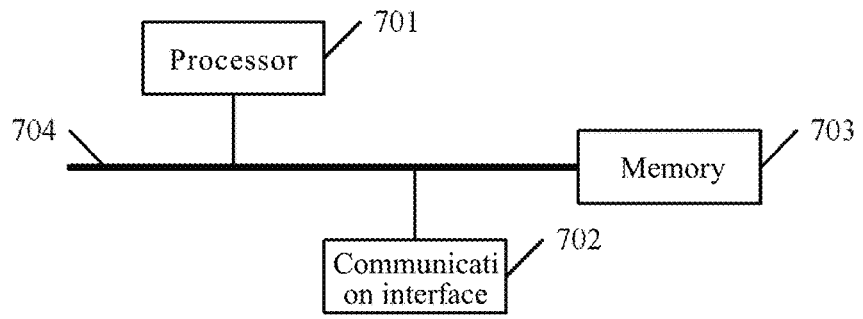
FIG. 7 is a schematic block diagram of an electronic device provided by at least one embodiment of the disclosure.

At least one embodiment of the disclosure further provides an electronic device. FIG. 7 is a schematic block diagram of an electronic device provided by at least one embodiment of the disclosure.

For example, as shown in FIG. 7, the electronic device includes a processor 701, a communication interface 702, a memory 703, and a communication bus 704. The processor 701, the communication interface 702, and the memory 703 communicate with each other through the communication bus 704. The processor 701, the communication interface 702, the memory 703 and other components can also communicate through a network connection. The disclosure provides no limitation to the types and functions of the network here.

For example, the memory 703 is configured for non-transitorily storing the computer-readable instructions. The processor 701 is configured to implement the receipt identification method described in any one of the above embodiments when executing computer-readable instructions. For the specific implementation of each step of the receipt identification method and related content, please refer to the above-mentioned embodiments of the receipt identification method, and no further descriptions are incorporated herein.

For example, other implementations of the receipt identification method implemented by the processor 701 executing the program stored in the memory 703 are the same as the implementations mentioned in the foregoing method embodiments, and will not be repeated here.

For example, the communication bus 704 may be a peripheral component interconnection standard (PCI) bus or an extended industry standard architecture (EISA) bus, etc. The communication bus can be classified into address bus, data bus, control bus, etc. For ease of description, the communication bus is only shown as a thick line, which does not mean that there is only one bus or only one type of bus.

For example, the communication interface 702 is configured to implement communication between the electronic device and other devices.

For example, the processor 701 and the memory 703 may be set on the server end (or the cloud).

For example, the processor 701 can control other elements in the electronic device to perform desired functions. The processor 701 can be a central processing unit (CPU), a network processor (NP), etc.; the processor 701 can also be a digital signal processor (DSP), an application-specific integrated circuit (ASIC), a field programmable gate array (FPGA) or other programmable logic devices, discrete gates or transistor logic devices, discrete hardware components. The central processing unit (CPU) can be an X86 or ARM architecture.

For example, the memory 703 may include any combination of one or more computer program products, and the computer program products may include various forms of computer-readable storage medium, such as volatile memory and/or non-volatile memory. The volatile memory may include, for example, random access memory (RAM) and/or cache memory. Non-volatile memory may include, for example, read-only memory (ROM), hard disk, erasable programmable read-only memory (EPROM), portable compact disk read-only memory (CD-ROM), universal serial bus (USB) memory, flash memory, etc. One or more computer-readable instructions may be stored on the computer-readable storage medium, and the processor 701 may run the computer-readable instructions to implement various functions of the electronic device. Various application programs and various data can also be stored in the storage medium.

For example, for a detailed description of the receipt identification process performed by the electronic device, reference may be made to the relevant description in the embodiment regarding the receipt identification method, and no further description will be incorporated herein.

Figure 8:
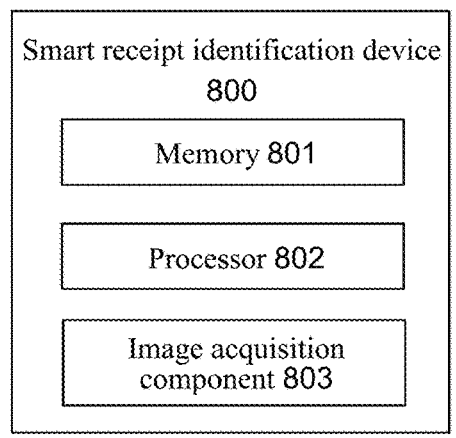
FIG. 8 is a schematic block diagram of a smart receipt identification device provided by at least one embodiment of the disclosure.

FIG. 8 is a schematic block diagram of a smart receipt identification device provided by at least one embodiment of the disclosure.

At least one embodiment of the disclosure further provides a smart receipt identification device. As shown in FIG. 8, the smart receipt identification device 800 may include a memory 801, a processor 802, and an image acquisition component 803. It should be noted that the components of the smart receipt identification device 800 shown in FIG. 8 are only exemplary and not limiting. The smart receipt identification device 800 may also have other components according to actual application requirements.

For example, the image acquisition component 803 is configured to obtain a receipt image, wherein the receipt image includes a receipt to be identified, and the receipt to be identified may be a paper receipt. The memory 801 is configured to store receipt images and computer-readable instructions. The processor 802 is configured to read the receipt image and run computer-readable instructions. When the computer-readable instructions are run by the processor 802, one or more steps in the receipt identification method described in any of the above embodiments are executed.

For example, the image acquisition component 803 is the image acquisition device described in the above embodiment of the receipt image identification method. For example, the image acquisition component 803 may be a camera of a smart phone, a camera of a tablet computer, a camera of a personal computer, lenses of digital cameras, webcams, and other devices used for capturing images.

For example, the receipt image may be the original receipt image directly captured by the image acquisition component 803, or may be an image obtained after preprocessing the original receipt image. Preprocessing can eliminate irrelevant information or noise information in the original receipt image, so as to better process the receipt image. The preprocessing may include, for example, performing data augmentation, image scaling, gamma correction, image enhancement, or noise reduction filtering on the original receipt image.

For example, the processor 802 can control other elements in the smart receipt identification device 800 to perform desired functions. The processor 802 may be a central processing unit (CPU), a tensor processor (TPU), or a graphics processing unit (GPU) and other devices with data processing capabilities and/or program execution capabilities.

For example, the memory 801 may include any combination of one or more computer program products, and the computer program products may include various forms of computer-readable storage medium, such as volatile memory and/or non-volatile memory. One or more computer-readable instructions can be stored on the computer-readable storage medium, and the processor 802 can run the computer-readable instructions to implement various functions of the smart receipt identification device 800.

For example, for a detailed description of the receipt image identification process performed by the smart receipt identification device 800, reference may be made to the relevant description in the embodiment of the receipt identification method, and no further description will be incorporated herein.

Figure 9:
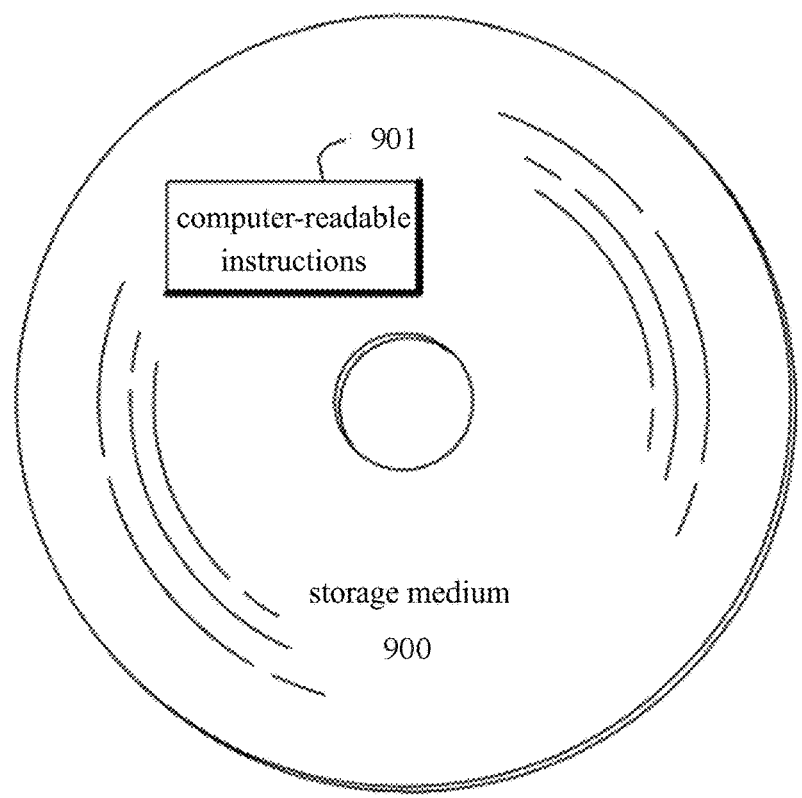
FIG. 9 is a schematic diagram of a non-transitory computer-readable storage medium provided by at least one embodiment of the disclosure.

FIG. 9 is a schematic diagram of a non-transitory computer-readable storage medium provided by at least one embodiment of the disclosure. For example, as shown in FIG. 9, one or more computer-readable instructions 901 may be non-transitorily stored on the storage medium 900. For example, when the computer-readable instruction 901 is executed by the processor, one or more steps in the receipt identification method as described above can be executed.

For example, the storage medium 900 may be applied to the above-mentioned electronic device and/or the smart receipt identification device 800, for example, the storage medium 900 may include the memory 703 in the electronic device and/or the memory 801 in the smart receipt identification device 800.

For example, for the description of the storage medium 900, reference may be made to the description of the memory in the embodiment of the electronic device and/or the smart receipt identification device 800, and no further description will be incorporated herein.

Figure 10:
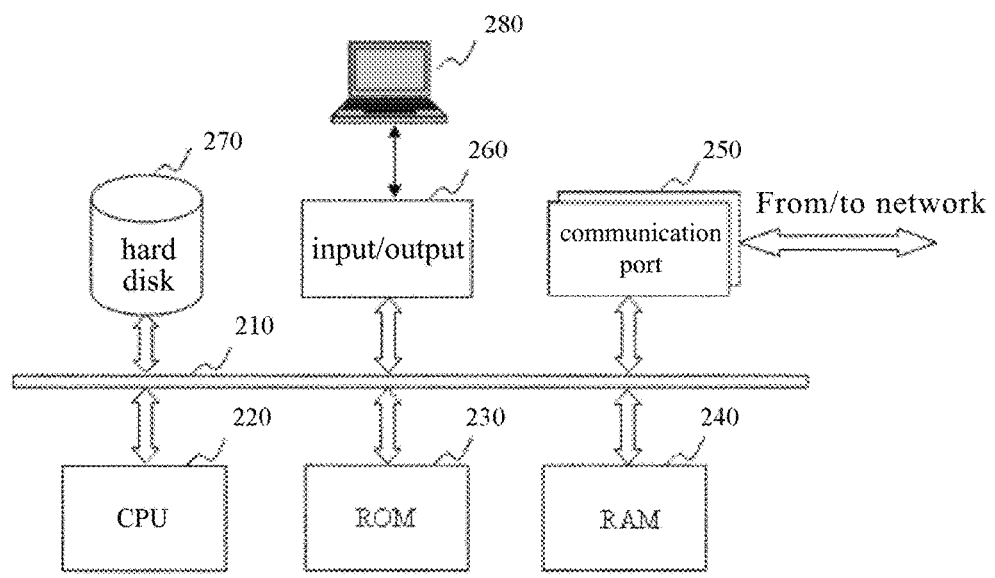
FIG. 10 is a schematic diagram of a hardware environment provided by at least one embodiment of the disclosure.

FIG. 10 is a schematic diagram of a hardware environment provided by at least one embodiment of the disclosure. The electronic device and/or smart receipt identification device provided in the disclosure can be applied to the Internet system.

The computer system provided in FIG. 10 can be used to implement the receipt identification apparatus, electronic device and/or smart receipt identification device involved in the disclosure. Such computer systems may include personal computers, notebook computers, tablet computers, mobile phones, personal digital assistants, smart converting glasses, smart watches, smart rings, smart helmets, and any smart portable devices or wearable devices. The specific system in this embodiment is described through a functional block diagram to explain a hardware platform including a user interface. This kind of computer equipment can be a general-purpose computer equipment or a specific-purpose computer equipment. Both types of computer equipment can be used to implement the receipt identification apparatus, electronic device and/or smart receipt identification device in this embodiment. The computer system can implement any components of the information required for the currently described receipt image identification. For example, a computer system can be realized by a computer equipment through its hardware device, software program, firmware, and a combination of the above. For the convenience of description, only one computer equipment is shown in FIG. 10, but the related computer functions of the information required for the currently described receipt image identification can be implemented in a distributive manner by a set of similar platform, thus balancing the load to be processed by the computer system.

As shown in FIG. 10, the computer system may include a communication port 250, which is connected to a network for data communication. For example, the computer system can send and receive information and data through the communication port 250, that is, the communication port 250 can realize the wireless or wired communication between the computer system and other electronic devices to exchange data. The computer system may further include a processor set 220 (i.e., the processor described above) for executing program instructions. The processor set 220 may be composed of at least one processor (for example, a CPU). The computer system may include an internal communication bus 210. The computer system may include different forms of program storage units and data storage units (that is, the memory or storage medium described above), such as a hard disk 270, a read-only memory (ROM) 230, and a random access memory (RAM) 240, which can be used to store various data files used for computer processing and/or communication, as well as possible program instructions executed by the processor set 220. The computer system may further include an input/output component 260, which is used to implement the input/output data flow between the computer system and other components (for example, the user interface 280, etc.).

Typically, the following devices can be connected to the input/output elements 260: including input devices such as touch screens, touch pads, keyboards, mice, cameras, microphones, accelerometers, gyroscopes, etc.; including, for example, output devices such as liquid crystal displays (LCD), speakers and vibrators; including storage devices such as tapes, hard disks, etc.; and communication interfaces.

Although FIG. 10 shows a computer system with various devices, it should be understood that the computer system is not required to have all the devices shown. Alternatively, the computer system may have more or fewer devices.

For this disclosure, the following need to be explained:

(1) The drawings of the embodiments of the disclosure only refer to the structures related to the embodiments of the disclosure, and other structures can be found in conventional designs.

(2) In the case of no conflict, the embodiments of the disclosure and the features in the embodiments can be combined with each other to obtain new embodiments.

The above are only specific implementations of the disclosure, but the protection scope of the disclosure is not limited thereto, and the protection scope of the disclosure should be subject to the protection scope of the claims.

What is claimed is:

1. A receipt identification method, comprising:
obtaining a receipt image, wherein the receipt image comprises a receipt to be identified;
identifying the receipt image by using a region identification model to obtain a plurality of character regions;
identifying the plurality of character regions by using a character identification model to obtain a plurality of character contents corresponding to the plurality of character regions; and
determining receipt information corresponding to the receipt to be identified according to the plurality of character contents,
wherein the receipt information comprises target information,
the step of determining the receipt information corresponding to the receipt to be identified according to the plurality of character contents comprises:
determining N keyword character regions corresponding to N preset keywords in the plurality of character regions according to the plurality of character contents;
determining M candidate character regions corresponding to the N keyword character regions in the plurality of character regions;
utilizing a scoring model to score based on a distance and a deviation angle between the N keyword character regions and the M candidate character regions in the receipt image, so as to determine Q character contents corresponding to the N preset keywords; and
determining the target information according to the Q character contents, wherein N, M and Q are positive integers.

2. The receipt identification method according to claim 1, wherein N and/or M are greater than or equal to 2,
the step of utilizing the scoring model to score based on the distance and the deviation angle between the N keyword character regions and the M candidate character regions in the receipt image, so as to determine the Q character contents corresponding to the N preset keywords comprises:
  determining a plurality of score calculating groups according to the N keyword character regions and the M candidate character regions, wherein each of the score calculating groups represents a corresponding relationship between the N keyword character regions and the M candidate character regions;
  calculating a plurality of scores corresponding to the plurality of score calculating groups based on the distance and the deviation angle between the N keyword character regions and the M candidate character regions, and determining the score calculating group corresponding to the highest score among the plurality of scores as a target score calculating group; and
  determining the Q character contents corresponding to the N preset keywords according to the corresponding relationship between the N keyword character regions and the M candidate character regions represented by the target score calculating group.

3. The receipt identification method according to claim 2, wherein the step of calculating the plurality of scores corresponding to the plurality of score calculating groups comprises:
  for each of the score calculating groups in the plurality of score calculating groups, calculating N scores corresponding to the N keyword character regions according to the distance and the deviation angle between the N keyword character regions and the candidate character regions corresponding to the N keyword character regions in the score calculating group, wherein in the score calculating group, the greater a distance between a connection line between the center of each of the keyword character regions and the center of its corresponding candidate character region, the smaller the score corresponding to each of the keyword character regions, the deviation angle between each of the keyword character regions and its corresponding candidate character region represents an angle between the connection line between the center of each of the keyword character regions and the center of its corresponding candidate character region and a preset direction, the smaller the deviation angle between each of the keyword character regions and its corresponding candidate character region, the greater the score corresponding to each of the keyword character regions; and
  the N scores are summed to obtain a score corresponding to the score calculating group, thereby obtaining a plurality of scores corresponding to the plurality of score calculating groups.

4. The receipt identification method according to claim 1, wherein the step of determining the M candidate character regions corresponding to the N keyword character regions in the plurality of character regions comprises:
  determining a score summing region by using the region identification model based on the N preset keywords; and
  determining the M candidate character regions in the plurality of character regions based on the score summing region, wherein the M candidate character regions are located in the score summing region.

5. The receipt identification method according to claim 1, wherein the target information is an item quantity and is represented by digits, and
  the character content in each of the M candidate character regions is digits.

6. The receipt identification method according to claim 5, wherein the N preset keywords comprise an amount keyword,
  the step of determining the target information based on the Q character contents comprises:
    converting the N preset keywords into a phrase to be queried, selecting a target amount determining rule corresponding to the phrase to be queried in a rule database, wherein the rule database stores a plurality of different phrases to be queried and the amount determining rules corresponding to the plurality of phrases to be queried;
    determining the amount keyword among the N preset keywords according to the target amount determining rule;
    determining the character content corresponding to the amount keyword in the Q character contents according to the amount keyword; and
    determining the item quantity according to the character content corresponding to the amount keyword.

7. The receipt identification method according to claim 1, wherein the receipt information further comprises an item name,
  the step of determining the receipt information corresponding to the receipt to be identified based on the plurality of character contents further comprises:
    utilizing a text classification identification model to classify the plurality of character contents so as to determine at least one candidate item name; and
    determining the item name corresponding to the receipt to be identified according to the at least one candidate item name.

8. The receipt identification method according to claim 7, wherein the step of determining the item name corresponding to the receipt to be identified according to the at least one candidate item name comprises:
  sorting the at least one candidate item name to determine at least one candidate item name group, wherein all the candidate item names in each of the candidate item name groups in the at least one candidate item name group are the same;
  determining a target candidate item name group according to the at least one candidate item name group, wherein the number of the candidate item names in the target candidate item name group is more than the number of the candidate item names in any of the remaining candidate item name groups in the at least one candidate item name group; and
  using the candidate item name corresponding to the target candidate item name group as the item name.

9. The receipt identification method according to claim 7, wherein the receipt information further comprises an item address,
  the step of determining the receipt information corresponding to the receipt to be identified based on the plurality of character contents further comprises:
    utilizing the text classification identification model to classify the plurality of character contents so as to determine at least one candidate item address; and
    determining the item address corresponding to the receipt to be identified according to the at least one candidate item address.

10. The receipt identification method according to claim 9, wherein the step of determining the item address corresponding to the receipt to be identified according to the at least one candidate item address comprises:

sorting the at least one candidate item address to determine at least one candidate item address group, wherein all the candidate item addresses in each of the candidate item address groups in the at least one candidate item address group are the same;

determining the target candidate item address group according to the at least one candidate item address group, wherein the number of the candidate item addresses in the target candidate item address group is more than the number of the candidate item addresses in any of the remaining candidate item address groups in the at least one candidate item address group; and using the candidate item address corresponding to the target candidate item address group as the item address.

11. The receipt identification method according to claim 1, wherein the receipt information further comprises an item name, the step of determining the receipt information corresponding to the receipt to be identified based on the plurality of character contents further comprises:
utilizing a text classification identification model to classify the plurality of character contents so as to determine at least one first candidate item name;
determining at least one second candidate item name by searching in an item name database according to the plurality of character contents;
determining the item name corresponding to the receipt to be identified according to the at least one first candidate item name and the at least one second candidate item name.

12. The receipt identification method according to claim 11, wherein when the receipt to be identified contains a pattern, the step of determining the at least one second candidate item name by searching in the item name database according to the plurality of character contents comprises:
utilizing the region identification model to identify a pattern region where the pattern in the receipt image is located;
determining whether there is an item pattern matching the pattern in the item name database according to the pattern region,
if there is the item pattern matching the pattern in the item name database, determining the item name corresponding to the item pattern that matches the pattern as at least one second candidate item name,
if there is no item pattern matching the pattern in the item name database, determining whether there are a character in the pattern region,
if there is the character in the pattern region, identifying a pattern character in the pattern region, and using the identified pattern character as the at least one second candidate item name;
if there are no characters in the pattern region, determining an item address based on the plurality of character contents, and determining the item address as the at least one second candidate item name;
wherein each of the item patterns in the item name database is marked with the corresponding item name.

13. The receipt identification method according to claim 1, wherein the receipt information further comprises an item address,
the step of determining the receipt information corresponding to the receipt to be identified based on the plurality of character contents further comprises:

utilizing a text classification identification model to classify the plurality of character contents to determine at least one first candidate item address;
if a preset character for identifying an address appears in one character region of the plurality of character regions, using a character following the preset character as at least one second candidate item address; and/or, if a character corresponding to an administrative region name or a street name appears in one character region of the plurality of character regions, using the character corresponding to the administrative region name or the street name as the at least one second candidate item address;
determining the item address corresponding to the receipt to be identified according to the at least one first candidate item address and the at least one second candidate item address.

14. A smart receipt identification device, comprising:
an image acquisition component configured to obtain a receipt image, wherein the receipt image comprises a receipt to be identified;
a memory configured to non-transitorily store the receipt image and computer-readable instructions;
a processor configured to read the receipt image and running the computer-readable instructions, wherein the computer-readable instructions are executed by the processor to implement the receipt identification method according to claim 1.

15. A non-transitory computer-readable storage medium, wherein the non-transitory computer-readable storage medium stores computer-readable instructions, and the computer-readable instructions are executed by a processor to implement the receipt identification method according to claim 1.

16. A receipt identification apparatus, comprising:
an acquisition module configured to obtain a receipt image, wherein the receipt image comprises a receipt to be identified;
a first identification module configured to identify the receipt image by using a region identification model to obtain a plurality of character regions;
a second identification module configured to identify the plurality of character regions by using a character identification model to obtain a plurality of character contents corresponding to the plurality of character regions;
a determining module configured to determine receipt information corresponding to the receipt to be identified according to the plurality of character contents,
wherein the receipt information comprises target information,
when performing operation of determining the receipt information corresponding to the receipt to be identified according to the plurality of character contents, the determining module is configured to perform following operations:
determining N keyword character regions corresponding to N preset keywords in the plurality of character regions according to the plurality of character contents;
determining M candidate character regions corresponding to the N keyword character regions in the plurality of character regions;
utilizing a scoring model to score based on a distance and a deviation angle between the N keyword character regions and the M candidate character regions in the receipt image, so as to determine Q character contents corresponding to the N preset keywords; and determining the target information according to the Q character contents, wherein N, M and Q are positive integers.

17. The receipt identification apparatus according to claim 16, wherein N and/or M are greater than or equal to 2, when performing operation of utilizing the scoring model to score based on the distance and the deviation angle between the N keyword character regions and the M candidate character regions, so as to determine the Q character contents corresponding to the N preset keywords, the determining module is configured to perform following operations:

determining a plurality of score calculating groups according to the N keyword character regions and the M candidate character regions, wherein each of the score calculating groups represents a corresponding relationship between the N keyword character regions and the M candidate character regions;

calculating a plurality of scores corresponding to the plurality of score calculating groups based on the distance and the deviation angle between the N keyword character regions and the M candidate character regions, and determining the score calculating group corresponding to the highest score among the plurality of scores as a target score calculating group;

determining the Q character contents corresponding to the N preset keywords according to the corresponding relationship between the N keyword character regions and the M candidate character regions represented by the target score calculating group.

18. The receipt identification apparatus according to claim 17, wherein when performing operation of calculating the plurality of scores corresponding to the plurality of score calculating groups, the determining module is configured to perform following operations:

for each of the score calculating groups in the plurality of score calculating groups, calculating N scores corresponding to the N keyword character regions according to the distance and the deviation angle between the N keyword character regions and the candidate character regions corresponding to the N keyword character regions in the score calculating group, wherein in the score calculating group, the greater a distance between a connection line between the center of each of the keyword character regions and the center of its corresponding candidate character region, the smaller the score corresponding to each of the keyword character regions, the deviation angle between each of the keyword character regions and its corresponding candidate character region represents an angle between the connection line between the center of each of the keyword character regions and the center of its corresponding candidate character region and a preset direction, the smaller the deviation angle between each of the keyword character regions and its corresponding candidate character region, the greater the score corresponding to each of the keyword character regions; and the N scores are summed to obtain a score corresponding to the score calculating group, thereby obtaining a plurality of scores corresponding to the plurality of score calculating groups.

19. The receipt identification apparatus according to claim 16, wherein when performing the operation of determining the M candidate character regions corresponding to the N keyword character regions in the plurality of character regions, the determining module is configured to perform following operations:

determining a score summing region by using the region identification model based on the N preset keywords; and determining the M candidate character regions in the plurality of character regions based on the score summing region, wherein the M candidate character regions are located in the score summing region.

20. The receipt identification apparatus according to claim 16, wherein the receipt information further comprises an item name, when performing operation of determining the receipt information corresponding to the receipt to be identified based on the plurality of character contents, the determining module is further configured to perform following operations:

utilizing a text classification identification model to classify the plurality of character contents so as to determine at least one candidate item name; and determining the item name corresponding to the receipt to be identified according to the at least one candidate item name.

21. The receipt identification apparatus according to claim 20, wherein the receipt information further comprises an item address, when performing operation of determining the receipt information corresponding to the receipt to be identified based on the plurality of character contents, the determining module is further configured to perform following operations:

utilizing the text classification identification model to classify the plurality of character contents so as to determine at least one candidate item address; and determining the item address corresponding to the receipt to be identified according to the at least one candidate item address.

22. The receipt identification apparatus according to claim 16, wherein the receipt information further comprises an item name and an item address, when performing operation of determining the receipt information corresponding to the receipt to be identified based on the plurality of character contents, the determining module is further configured to perform following operations:

utilizing a text classification identification model to classify the plurality of character contents to determine at least one first candidate item name and at least one first candidate item address;

determining at least one second candidate item name by searching in an item name database according to the plurality of character contents;

if a preset character for identifying an address appears in one character region of the plurality of character regions, using a character following the preset character as at least one second candidate item address; and/or, if a character corresponding to an administrative region name or a street name appears in one character region of the plurality of character regions, using the character corresponding to the administrative region name or the street name as the at least one second candidate item address;

determining the item address corresponding to the receipt to be identified according to the at least one first candidate item name and the at least one second candidate item name; and determining the item address corresponding to the receipt to be identified according to the at least one first candidate item address and the at least one second candidate item address.

\* \* \* \* \*